(12) United States Patent
Tamba et al.

(10) Patent No.: US 12,331,486 B2
(45) Date of Patent: Jun. 17, 2025

(54) WORKING MACHINE

(71) Applicant: KUBOTA CORPORATION, Osaka (JP)

(72) Inventors: Daiki Tamba, Osaka (JP); Yukifumi Yamanaka, Osaka (JP); Yuki Shimoike, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 846 days.

(21) Appl. No.: 17/347,693

(22) Filed: Jun. 15, 2021

(65) Prior Publication Data

US 2021/0310214 A1 Oct. 7, 2021

Related U.S. Application Data

(63) Continuation of application No. PCT/JP2020/024730, filed on Jun. 24, 2020.

(30) Foreign Application Priority Data

| Jun. 28, 2019 | (JP) | ................................ | 2019-122511 |
| Jun. 28, 2019 | (JP) | ................................ | 2019-122515 |
| Jun. 28, 2019 | (JP) | ................................ | 2019-122516 |

(51) Int. Cl.
*E02F 9/20* (2006.01)
*E02F 3/84* (2006.01)

(52) U.S. Cl.
CPC .............. *E02F 9/2075* (2013.01); *E02F 3/84* (2013.01)

(58) Field of Classification Search
CPC .......... E02F 9/2075; E02F 3/84; B60K 6/485; B60L 50/16; B60L 50/60; B60W 10/08; B60W 20/00
See application file for complete search history.

(56) References Cited

U.S. PATENT DOCUMENTS 6,173,574 B1 * 1/2001 Obayashi ............ B60L 15/2045
  903/910
8,812,197 B2 * 8/2014 Itou ......................... B60L 50/16
  180/242

(Continued)

FOREIGN PATENT DOCUMENTS

EP 2 551 163 A1 1/2013
EP 2 682 531 A1 1/2014

(Continued)

OTHER PUBLICATIONS

EPO machine translation of JP 2000-32608 A description. (Year: 2000).*

(Continued)

*Primary Examiner* — Navid Z. Mehdizadeh
*Assistant Examiner* — Shelley Marie Osterhout
(74) *Attorney, Agent, or Firm* — Greenblum & Bernstein, P.L.C.

(57) ABSTRACT

The working machine includes a machine body, an engine provided on the machine body, a motor generator to be operated as a motor to assist driving of the engine in an assisting operation and to be operated as a generator by power of the engine to generate electricity in a generating operation, a battery to store the electricity generated by the motor generator, an acceleration sensor to measure acceleration of the machine body, and a controller to selectively set either one of the assisting operation and the generating operation based on the acceleration of the machine body measured by the acceleration sensor.

6 Claims, 25 Drawing Sheets

(56) References Cited

U.S. PATENT DOCUMENTS

| | | |
|---|---|---|
| 2002/0104239 A1 | 8/2002 | Naruse et al. |
| 2007/0228822 A1 | 10/2007 | Hirata |
| 2008/0059022 A1* | 3/2008 | Shimodaira ......... B60L 15/2045 |
| | | 701/36 |
| 2014/0241842 A1* | 8/2014 | Shiratani ............... E02F 9/2075 |
| | | 414/744.2 |
| 2016/0362102 A1 | 12/2016 | Honda et al. |
| 2017/0203748 A1 | 7/2017 | Imai et al. |
| 2017/0362796 A1 | 12/2017 | Nakagawa et al. |

FOREIGN PATENT DOCUMENTS

| | | | | |
|---|---|---|---|---|
| JP | 2000032608 A | * | 1/2000 | ............. B60K 6/365 |
| JP | 2001-105843 A | | 4/2001 | |
| JP | 2004008008 A | * | 1/2004 | |
| JP | 2004242558 A | * | 9/2004 | ............. B60L 11/12 |
| JP | 3941951 B2 | | 7/2007 | |
| JP | 2007-295784 A | | 11/2007 | |
| JP | 2008-067436 A | | 3/2008 | |
| JP | 2009-174446 A | | 8/2009 | |
| JP | 2009-261227 A | | 11/2009 | |
| JP | 2015-9730 A | | 1/2015 | |
| JP | 2016-155439 A | | 9/2016 | |
| JP | 6161499 B2 | * | 7/2017 | ............. A01D 41/02 |
| JP | 2017-227000 A | | 12/2017 | |
| WO | 2016/114406 A1 | | 7/2016 | |
| WO | 2016/133182 A1 | | 8/2016 | |

OTHER PUBLICATIONS

Official Communication issued in European Patent Office (EPO) Patent Application No. 20831966.5, dated Aug. 7, 2023.
International Search Report issued in International Patent Application No. PCT/JP2020/024730, dated Sep. 24, 2020, along with English Translation thereof.
Decision of Refusal issued in Japanese Patent Application No. 2019-122511 dated Aug. 17, 2022, along with English translation thereof.

* cited by examiner

Fig.13

|  | 1st acceleration | 2nd acceleration | Yaw rate |
|---|---|---|---|
| Straight traveling | Threshold or more | — | — |
| Non-straight traveling — Turning 1 | Less than threshold | Threshold or more | Threshold or more |
| Non-straight traveling — Turning 2 | Less than threshold | Less than threshold | Threshold or more |
| Non-straight traveling — Others (other than turning) | Less than threshold | — | Less than threshold |

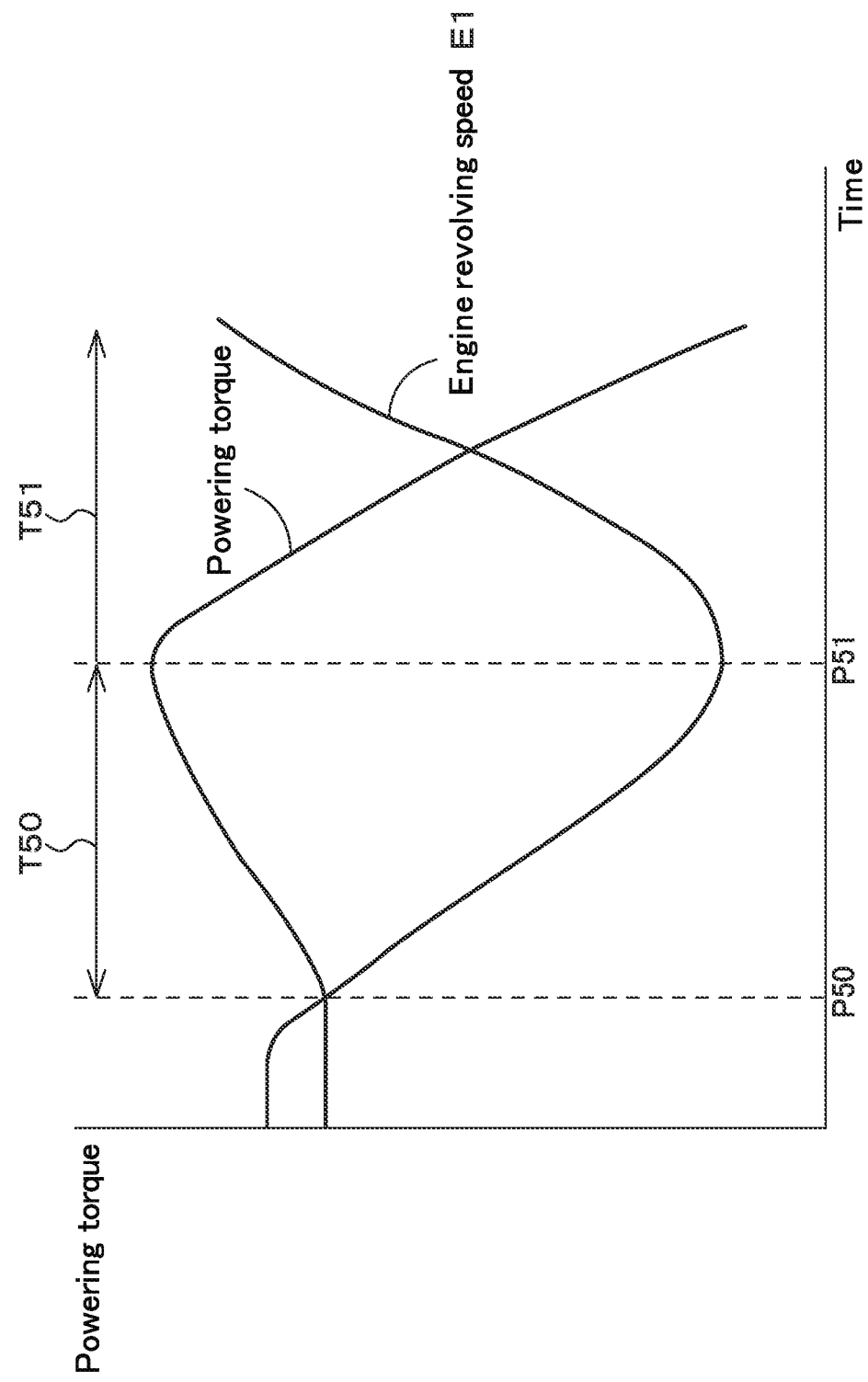

WORKING MACHINE

CROSS REFERENCE TO RELATED APPLICATIONS

This application is a continuation application of International Application No. PCT/JP2020/024730, filed on Jun. 24, 2020, which claims the benefit of priority to Japanese Patent Application No. 2019-122511, filed on Jun. 28, 2019, to Japanese Patent Application No. 2019-122515, filed on Jun. 28, 2019, and to Japanese Patent Application No. 2019-122516, filed on Jun. 28, 2019. The entire contents of each of these applications are hereby incorporated herein by reference.

BACKGROUND OF THE INVENTION

Field of the Invention

The present invention relates to a working machine such as a compact track loader or a skid steer loader.

Description of the Related Art

Japanese Patent Publication No. 3941951 is known, which discloses a hybrid type working machine including an engine and a motor generator among working machines such as a compact track loader. In the working machine of Japanese Patent Publication No. 3941951, when an operation-mode judgment means determines that a hydraulic-operating portion is in the working mode, an electric motor generator controller means obtains a powering torque value to be output to the electric motor generator with reference to an actual engine revolving speed detected by an engine revolving speed detector means based on a powering torque output information obtained by relating, to the engine revolving speed, the powering torque output characteristics of the electric motor generator, which is set according to the current working mode.

In Japanese Patent Publication No. 3941951, when a remaining amount of power storage detected by a remaining power-storage detector means is less than a predetermined value, the powering torque value obtained above is limited according to a remaining amount of power storage, and a driving signal is output to an inverter so that the electric motor generator outputs a limited powering torque value.

In addition, a working machine of Japanese Unexamined Patent Application Publication No. 2009-174446 includes an assist torque adding means to add an assist torque on an output torque, and an overloading state judgment means to judge whether an overloading state in which an input torque exceeds an output torque occurs, and further the assist torque adding means adds the assist torque on the output torque when it is judged the overloading state is occurring presently.

SUMMARY OF THE INVENTION

A working machine of the present invention includes a machine body, an engine provided on the machine body, a motor generator to be operated as a motor to assist driving of the engine in an assisting operation and to be operated as a generator by power of the engine to generate electricity in a generating operation, a battery to store the electricity generated by the motor generator, an acceleration sensor to measure acceleration of the machine body, and a controller to selectively set either one of the assisting operation and the generating operation based on the acceleration of the machine body measured by the acceleration sensor.

The controller estimates, based on the acceleration of the machine body measured by the acceleration sensor, what kind of traveling state the machine body is in, and performs the selective setting based on the estimated traveling state.

When a fore-and-aft directional acceleration of the machine body is not less than a threshold, the controller estimates that the machine body is in a straight traveling state where the machine body is traveling straight. When the fore-and-aft directional acceleration of the machine body is less than the threshold, the controller estimates that the machine body is in a non-straight traveling state defined as any traveling state other than the straight traveling state. The controller selectively sets either one of the assisting operation and the generating operation based on whether the traveling state is estimated as the straight traveling state or the non-straight traveling state.

The controller estimates, based on a width directional acceleration of the machine body and on a yaw rate of the machine body, whether the machine body is in a turning state where the machine body is turning or not. The controller selectively sets either one of the assisting operation and the generating operation based on whether or not the traveling state is estimated as the turning state.

The controller includes a powering torque setting unit to set a powering torque of the motor generator in the assisting operation, a regenerating torque setting unit to set a regenerating torque of the motor generator in the generating operation, and an operation control unit to perform the assisting operation at the powering torque set by the powering torque setting unit when a revolving speed of the engine is not higher than a first revolving speed, and to perform the generating operation at the regenerating torque set by the regenerating torque setting unit when the revolving speed of the engine is not lower than a second revolving speed that is higher than the first revolving speed.

Either one of the powering torque setting unit and the regenerating torque setting unit changes the setting of corresponding one of the powering torque and the regenerating torque based on the acceleration of the machine body.

The controller changes either the first revolving speed or the second revolving speed based on the acceleration of the machine body.

A working machine includes a machine body, an engine provided on the machine body, a motor generator to be operated as a motor to assist driving of the engine in an assisting operation, and to be operated as a generator by power of the engine to generate electricity in a generating operation, a battery to store the electricity generated by the motor generator, a cooling device to cool the battery with the power transmitted from the engine, a hydraulic driving device to which the powers of the engine and the motor generator are transmitted, a working device to be operated by power of the hydraulic driving device, and a traveling device to be operated by the power of the hydraulic driving device. The cooling device stops based on an operating state of either one of the hydraulic diving device, the working device, and the traveling device.

The working machine includes a load detector to detect a load of either one of the hydraulic diving device, the working device, and the traveling device. The cooling device stops when the load detected by the load detector is a predetermined load or more.

The working machine includes an operation member to operate either one of the working device and the traveling device. The cooling device stops when an operation extent of the operation member is a predetermined extent or more.

The working machine includes a temperature detector to detect temperature of the battery. The cooling device does not stop when the temperature detected by the temperature detector is a predetermined temperature or more.

The cooling device includes an evaporator through which coolant to cool the battery flows, and a compressor to compress the coolant that has flown through the evaporator. The compressor stops based on the operating state.

The hydraulic driving device includes a hydraulic pump, and the working device includes a boom swingably provided on the machine body, and a boom cylinder to be operated by hydraulic fluid delivered from the hydraulic pump to swing the boom.

A working machine includes a machine body, an engine provided on the machine body, a motor generator to be operated as a motor to assist driving of the engine in an assisting operation and to be operated as a generator by power of the engine to generate electricity in a generating operation, a battery to store the electricity generated by the motor generator, a traveling device to be operated by powers of at least the engine and the motor generator, and a controller configured so that, in a state where the motor generator is in the assisting operation, the controller stops or limits the assisting operation when an outputting condition relating to outputting from the traveling device deviates from that corresponding to an inputting condition relating to inputting to the traveling device.

The working machine includes a traveling operation member to operate the traveling device, and a rotation detector to detect a rotation speed of the traveling device. When the inputting condition is an operation extent of the traveling operation member and the outputting condition is the rotation speed detected by the rotation detector, the controller stops or limits the assisting operation when the rotation speed of the traveling device is lower than that corresponding to the operation extent.

The working machine includes a traveling operation member to operate the traveling device, and a rotation detector to detect a rotation speed of the traveling device. When the inputting condition is an operation extent of the traveling operation member and the outputting condition is the rotation speed detected by the rotation detector, the controller stops or limits the assisting operation when the rotation speed of the traveling device is higher than that corresponding to the operation extent.

The working machine includes a traveling operation member to operate the traveling device, and a vehicle-speed detector to detect a vehicle speed of the machine body. When the inputting condition is an operation extent of the traveling operation member and the outputting condition is the vehicle speed detected by the vehicle-speed detector, the controller stops or limits the assisting operation when the vehicle speed is lower than that corresponding to the operation extent.

The working machine includes a traveling operation member to operate the traveling device, and a vehicle-speed detector to detect a vehicle speed of the machine body. When the inputting condition is an operation extent of the traveling operation member and the outputting condition is the vehicle speed detected by the vehicle-speed detector, the controller stops or limits the assisting operation when the vehicle speed is higher than that corresponding to the operation extent.

The controller includes a powering torque setting unit to set a powering torque of the motor generator in the assisting operation, a regenerating torque setting unit to set a regenerating torque of the motor generator in the generating operation, and an operation control unit to perform the assisting operation at the powering torque set by the powering torque setting unit when a revolving speed of the engine is not higher than a first revolving speed, and to perform the generating operation at the regenerating torque set by the regenerating torque setting unit when the revolving speed of the engine is not lower than a second revolving speed that is higher than the first revolving speed.

The powering torque setting unit reduces the powering torque when the deviation occurs.

The powering torque setting unit increases the powering torque when a load on the engine increases. The power torque setting unit reduces the powering torque when the load on the engine reduces.

The working machine includes a detection sensor to detect the revolving speed of the engine. The powering torque setting unit increases the powering torque when the revolving speed of the engine detected by the detection sensor increases. The powering torque setting unit reduces the powering torque when the revolving speed of the engine reduces.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 13 is a view illustrating a relationship between a traveling state and an inertial force detected by the inertial measurement unit.

FIG. 21 is a view illustrating a relationship between an engine revolving speed and a powering torque in an assisting operation.

DETAILED DESCRIPTION OF THE PREFERRED EMBODIMENTS

Figure 1:
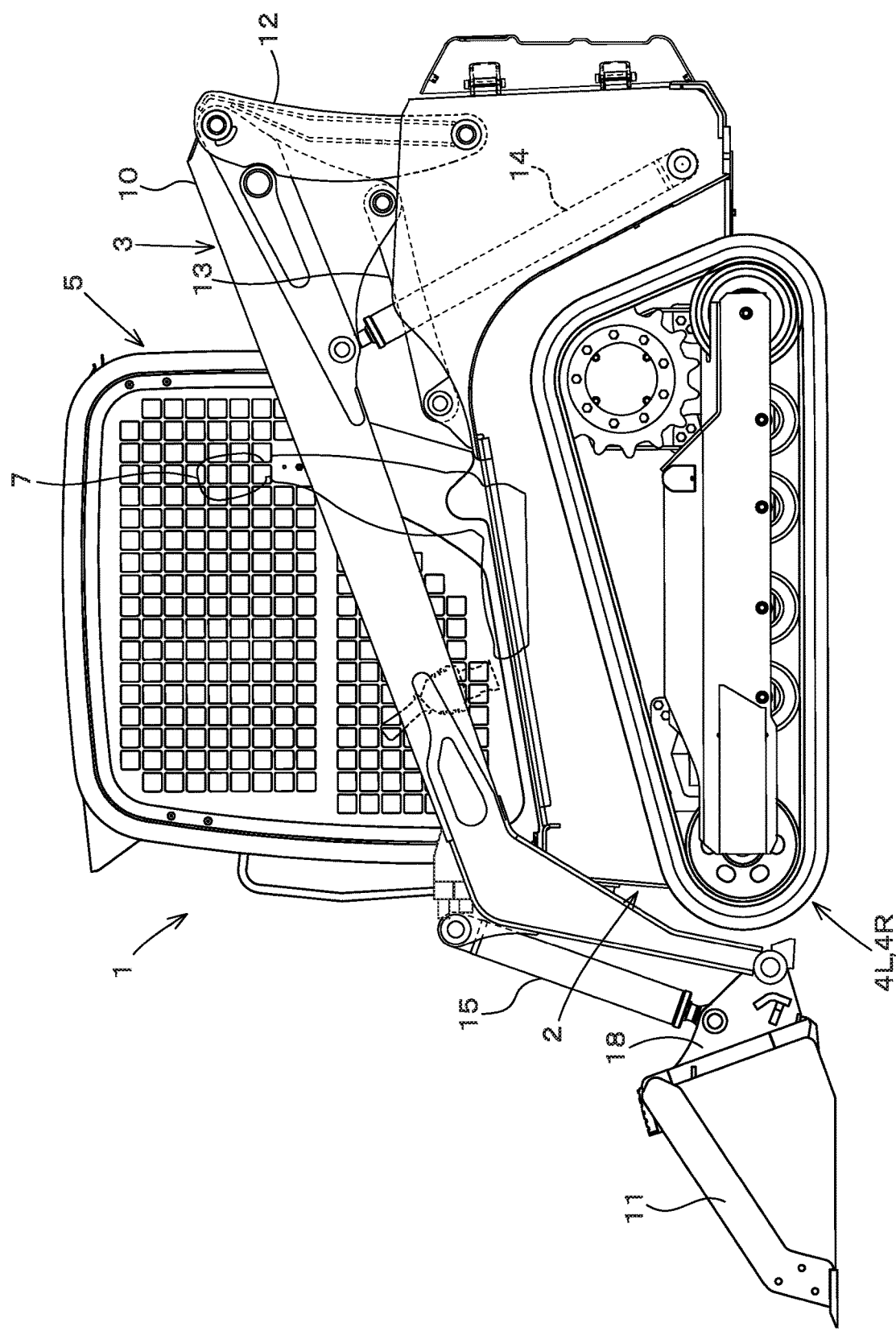
FIG. 1 is an overall side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to drawings, a working machine according to an embodiment of the present invention will be described below.

FIG. 1 shows a side view of a working machine 1 of the present invention. In FIG. 1, a compact track loader is illustrated as an example of a working machine. However, the working machine is not limited to a compact track loader, but may be another typed loader, such as a skid steer loader, for example. In addition, it may also be a working machine other than the loader. In description of the present invention, a forward direction of an operator seating on a driver seat of the working machine (the left side in FIG. 1) is referred to as the front, a rearward direction of the operator (the right side in FIG. 1) is referred to as the rear, a left direction of the operator (the front surface side of FIG. 1) is referred to as the left, and a right direction of the operator (the back surface side of FIG. 1) is referred to as the right. A direction orthogonal to the forward and rearward directions of a machine body may be referred to as a machine width direction (also referred to as a width direction).

The working machine 1 includes a machine body 2, a working device 3, and a pair of traveling devices 4L and 4R. A cabin 5 is mounted on an upper front portion of the machine body 2. A rear portion of the cabin 5 is supported by a bracket of the machine body 2 pivotally around a support shaft. A front portion of the cabin 5 is configured to be mounted on a front portion of the machine body 2. A driver seat 7 is provided in the cabin 5.

The pair of traveling devices 4L and 4R are constituted of crawler-type traveling devices. The traveling device 4L is installed on one side (left side) of the machine body 2, and the traveling device 4R is installed on the other side (right side) of the machine body 2.

The working device 3 includes booms 10, boom cylinders 14, working tool cylinders 15, and a working tool 11. The booms 10 are supported by lift links 12 and control links 13. Each of the boom cylinders 14, which consists of a double-acting hydraulic cylinder, is interposed between a base portion of the corresponding boom 10 and a rear lower portion of the machine body 2. By simultaneously extending and contracting the boom cylinders 14, the booms 10 are pivoted up and down.

At a tip end of the boom 10, each of attachment brackets 18 is supported pivotally around a horizontal axis, and the back surface of the working tool 11 is attached to the left and right attachment brackets 18. That is, the working tool 11 is attached to the tip ends of the booms 10.

Each of the working tool cylinders 15, which is a double-acting hydraulic cylinder, is interposed between the corresponding attachment bracket 18 and a middle portion of the tip end of the corresponding boom 10. The extending and contracting of the working tool cylinders 15 swing the working tool 11 (the scooping and dumping operations).

The working tool 11 is configured to be attached to and detached from the attachment brackets 18. The working tool 11 is, for example, an attachment (auxiliary attachment) such as a bucket, a hydraulic crusher, a hydraulic breakers, an angle broom, an earth auger, a pallet fork, a sweeper, a mower, or a snow blower.

Next, the machine body will be described.

Figure 2:
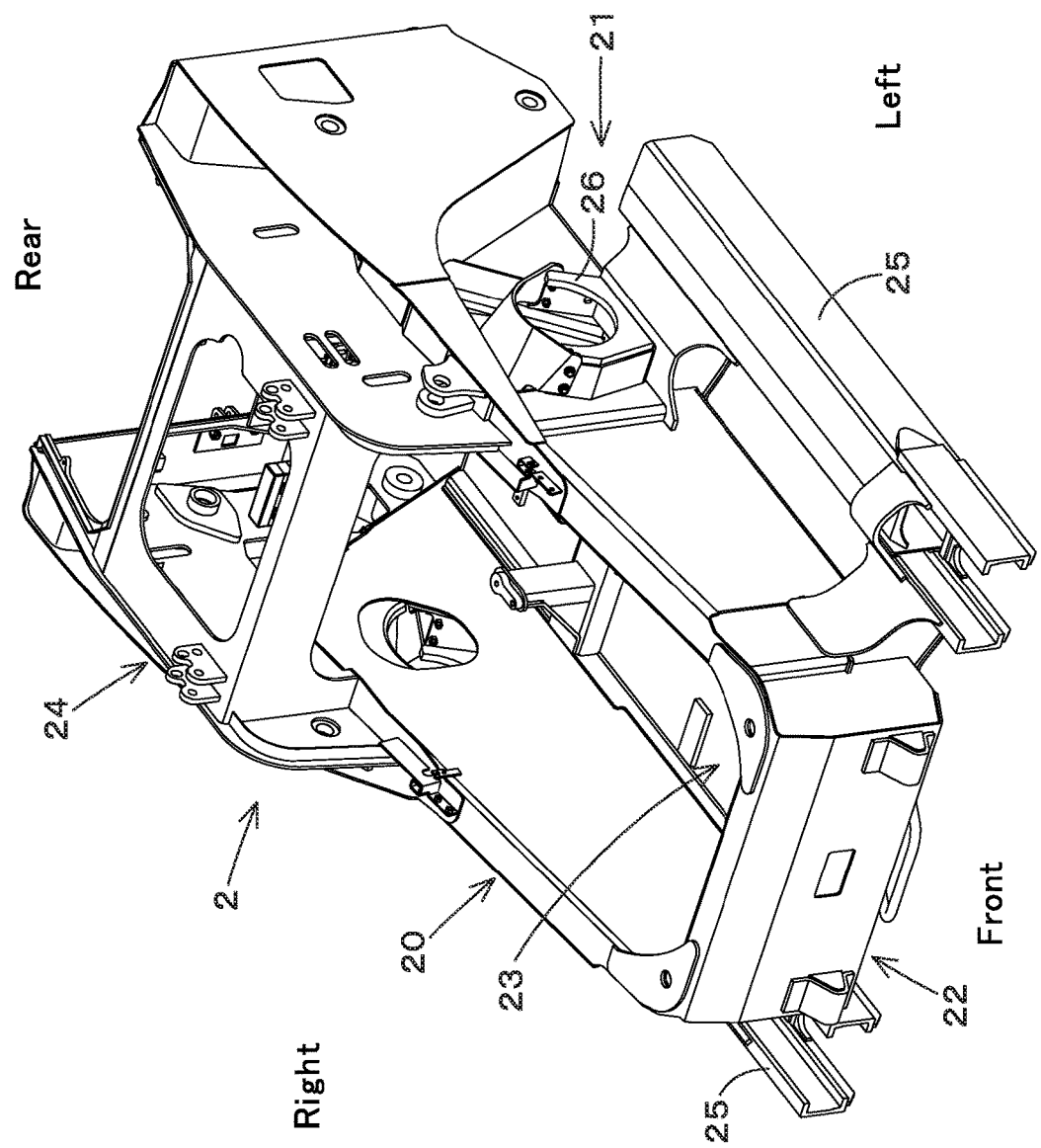
FIG. 2 is a perspective view of the machine body.

As shown in FIG. 2, the machine body 2 has a right frame portion 20, a left frame portion 21, a front frame portion 22, a bottom frame portion 23, and an upper frame portion 24.

The right frame portion 20 constitutes a right portion of the machine body 2. The left frame portion 21 constitutes a left portion of the machine body 2. The front frame portion 22 constitutes a front portion of the machine body 2, and connects front portions of the right frame portion 20 and the left frame portion 21 with each other. The bottom frame portion 23 constitutes a bottom portion of the machine body 2, and connects lower portions of the right frame portion 20 and the left frame portion 21 with each other. An upper frame portion 24 constitutes a rearward upper portion of the machine body 2, and connects upper rearward portions of the right frame portion 20 and the left frame portion 21 with each other.

Rear portions of the right frame portion 20 and the left frame portion 21 swingably support the booms 10 and the like. Each of the right frame portion 20 and the left frame portion 21 is provided with a track frame 25 and a motor attachment portion 26.

Figure 3:
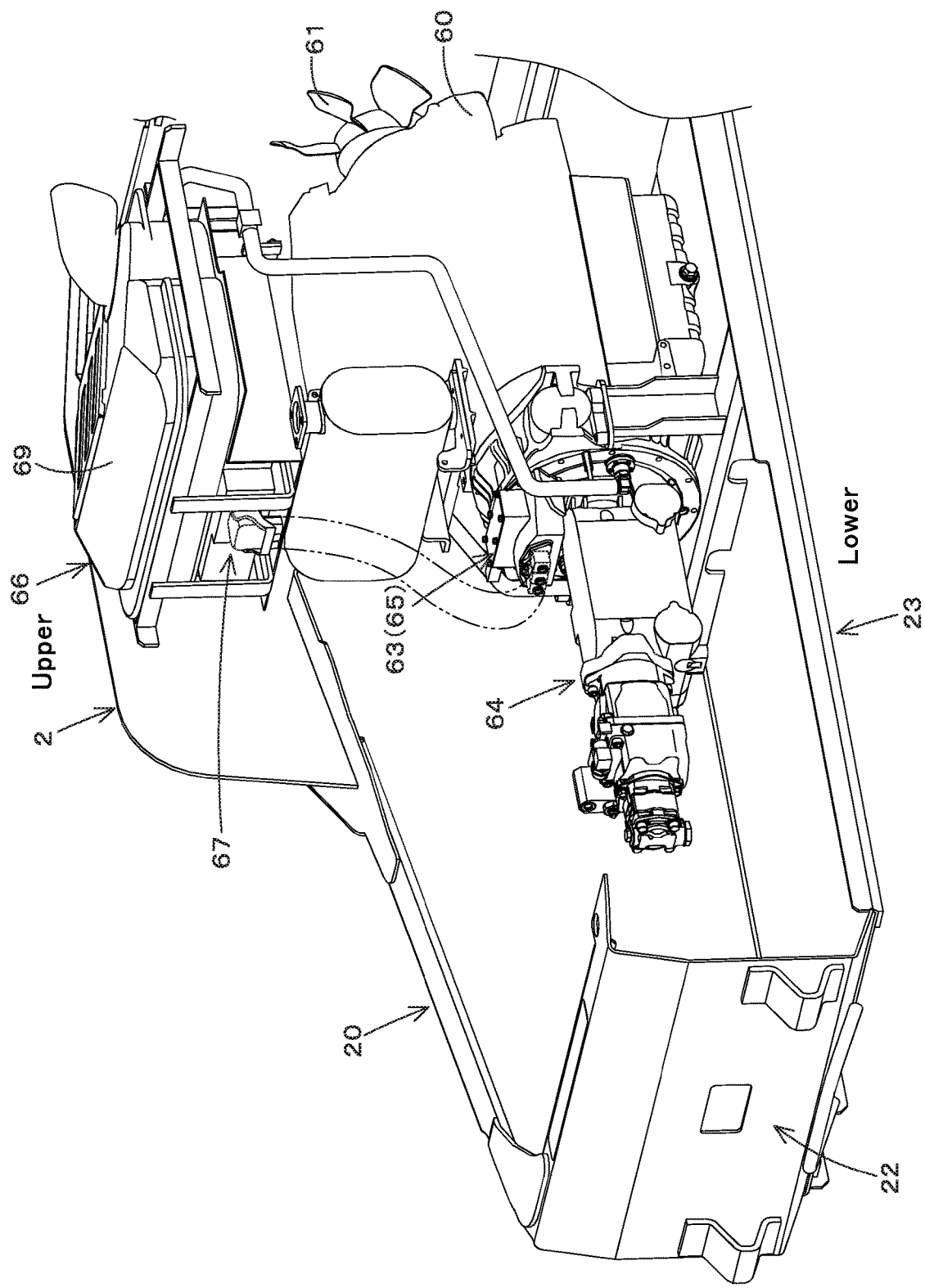
FIG. 3 is a perspective view illustrating arrangement of equipment (devices).

As shown in FIG. 3, an engine 60, a cooling fan 61, a radiator, a motor generator 63, and a hydraulic driving device 64 is installed on the machine body 2. The engine 60 is an internal combustion engine such as a diesel engine or a gasoline engine. The cooling fan 61 is driven by the power of the engine 60, and the radiator cools cooling water for cooling the engine 60. The motor generator 63 is a device configured to be operated as a motor to assist driving of the engine 60 in an assisting operation and to be operated as a generator by power of the engine to generate electricity in a generating operation. The motor generator 63 is constituted of a permanent magnet embedded three-phase AC synchronous motor.

Figure 5:
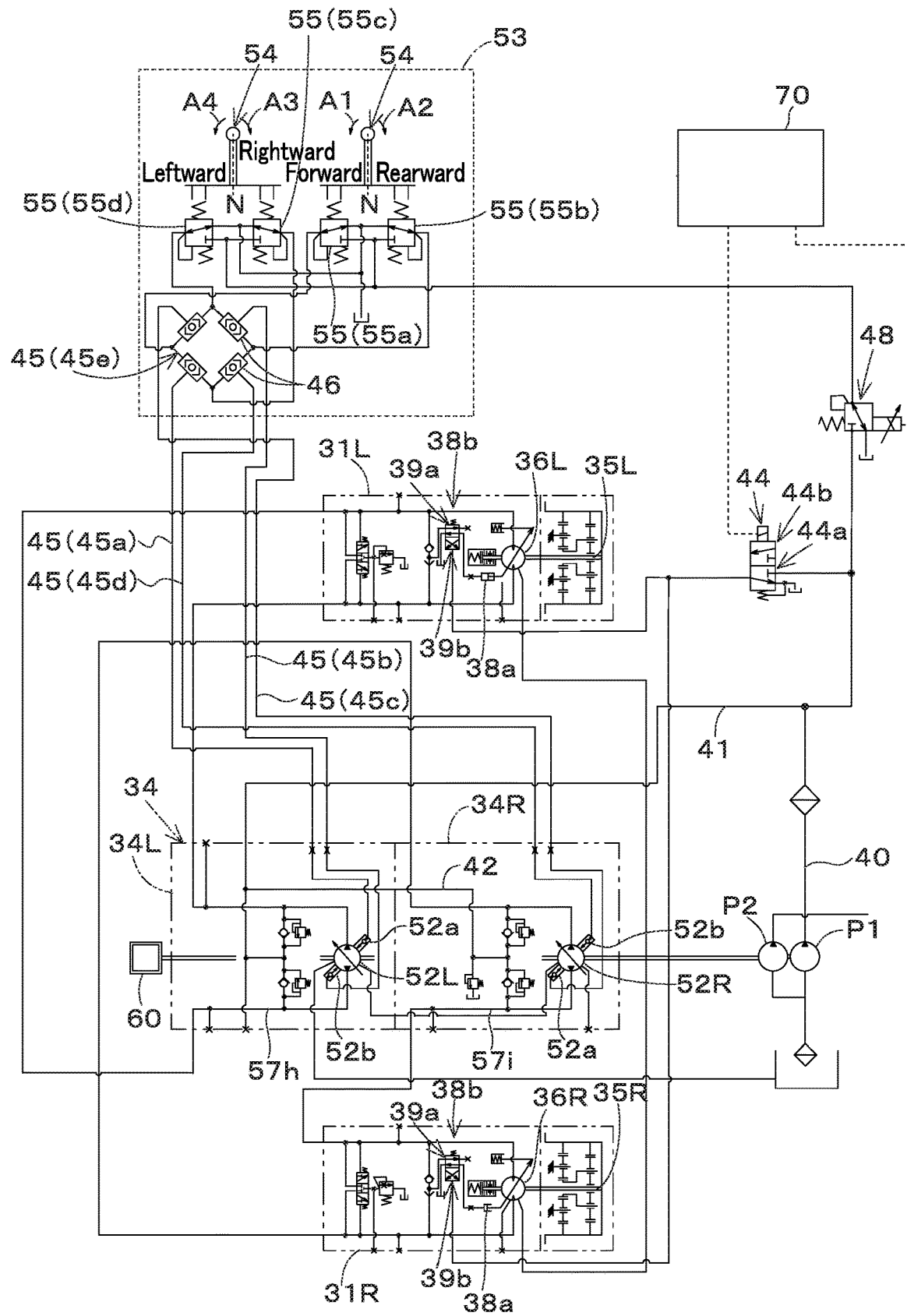
FIG. 5 is a view illustrating a hydraulic system for traveling.
Figure 6:
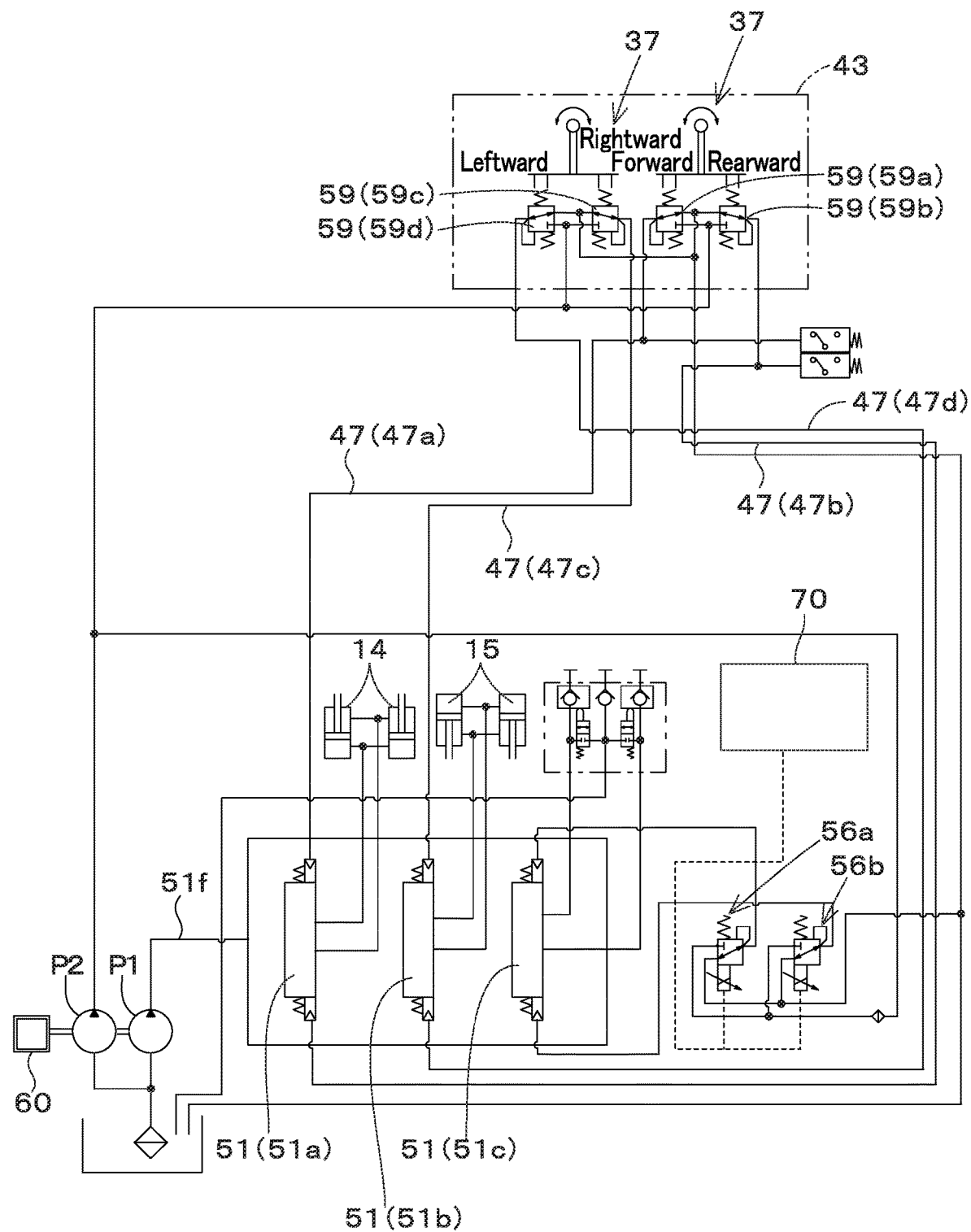
FIG. 6 is a view illustrating the hydraulic system for working.

The hydraulic driving device 64 is a device configured to be driven by powers/power of the engine 60 and/or the motor generator 63, and mainly outputs power for working. The hydraulic driving device 64 is located in front of the motor generator 63. The hydraulic driving device 64 includes a plurality of hydraulic pumps, and, as shown in FIGS. 5 and 6, the plurality of hydraulic pumps include a traveling pump 52L, a traveling pump 52R, a sub pump P1, and a main pump P2, for example.

In addition, a battery 66 and an electric power controller 67 are provided on the machine body 2.

The battery 66 stores an electric power generated by the motor generator 63, and supplies the stored electric power to the motor generator 63 and other devices.

The working machine 1 is configured to drive the hydraulic driving device 64 by power of the engine 60, to drive the hydraulic driving device 64 with both the engine 60 and the motor generator 63, and to operate the motor generator 63 by power of the engine 60 so as to generate electricity. That is, transmission of power to the working device is performed in a parallel hybrid system. A power transmission structure of the engine 60 and the motor generator 63 will be described below.

Figure 4:
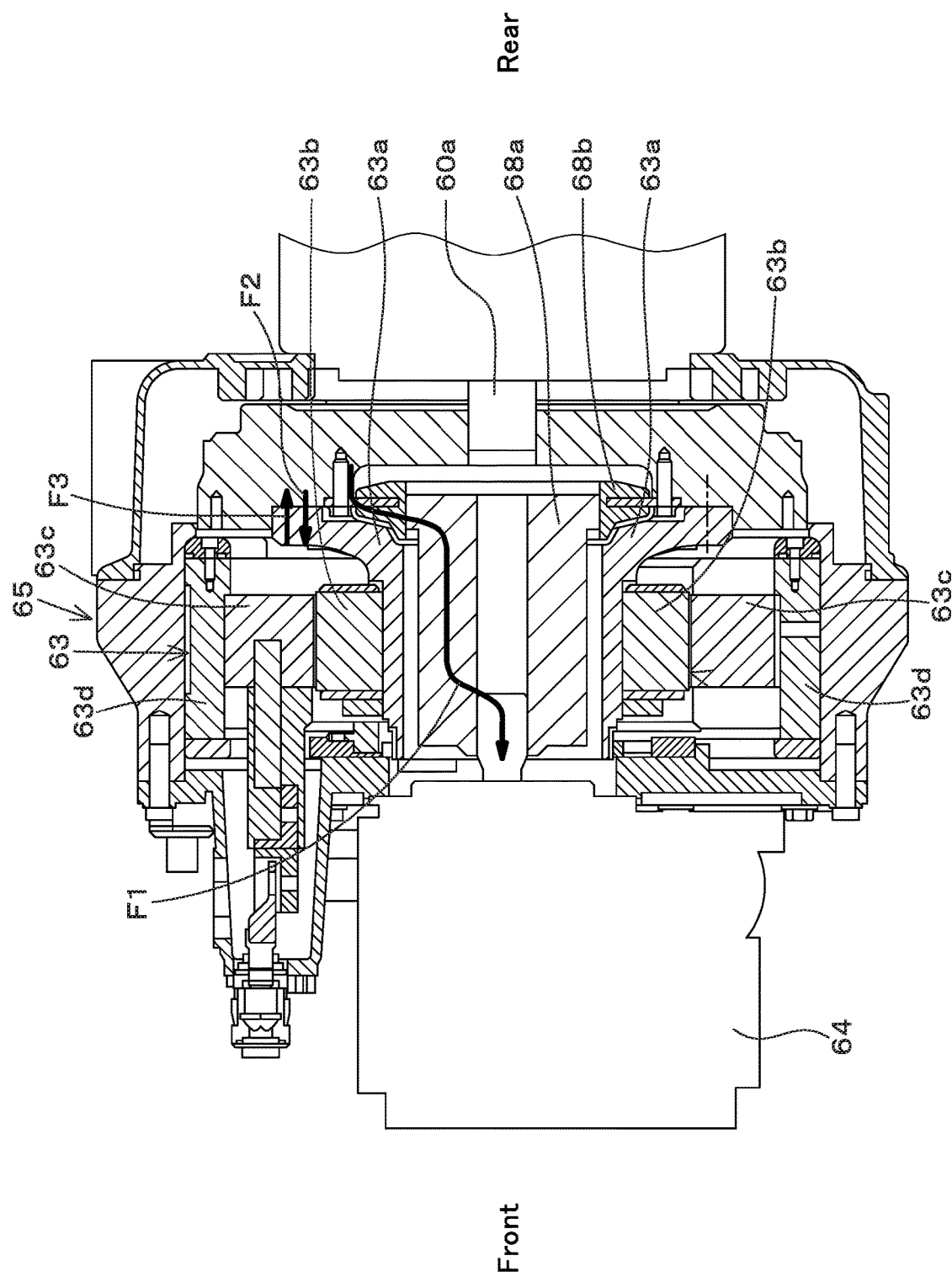
FIG. 4 is a cross-sectional view illustrating inside of a rotating electric machine.

As shown in FIGS. 3 and 4, a housing 65 is located on a front portion of the engine 60, the housing 65 houses a flywheel having a substantially-discoidal shape and the motor generator 63. The motor generator 63 includes a coupler portion 63a connecting to the flywheel, a rotor 63b fixed to the coupler portion 63a, a stator 63c provided on the rotor 63b, and a water jacket 63d provided on an outside of the stator 63c.

The coupler portion 63a is formed to have a cylindrical shape, and has a rear end attached to the flywheel. An intermediate shaft 68a is provided inside the coupler portion 63a. A coupler 68b is located at the rear end of the intermediate shaft 68a, and an outer side of the coupler 68b is connected to the flywheel. In addition, a front end of the intermediate shaft 68a is connected to a drive shaft of the hydraulic driving device 64.

Thus, when the engine 60 is driven, a rotational power of the crankshaft (output shaft) 60a of the engine 60 is transmitted to the flywheel to rotate the flywheel. As shown by an arrowed line F1 in FIG. 4, a rotational power of the flywheel is transmitted from the coupler 68b to the intermediate shaft 68a, and then transmitted from the intermediate shaft 68a to the drive shaft of the hydraulic driving device 64 to drive the hydraulic driving device 64.

In addition, as shown by an arrowed line F2 in FIG. 4, a rotational power of the flywheel is transmitted to the rotor 63b through the coupler portion 63a. Thus, when a rotational power of the engine 60 is transmitted to the rotor 63b (and the coupler portion 63a), the motor generator 63 can be operated as a generator. On the other hand, when an electric power stored in the battery 66 is supplied to the stator 63c, the rotor 63b can be rotated. As shown by an arrowed line F3, a rotational power of the rotor 63b can be transmitted to the flywheel through the coupler portion 63a. Thus, the motor generator 63 can be operated as an electric motor to assist the engine 60.

FIGS. 5 and 6 show respective hydraulic circuits (hydraulic systems) of the working device. FIG. 5 shows a hydraulic system for traveling, and FIG. 6 shows a hydraulic system for working.

As shown in FIG. 5, the hydraulic system for traveling is a system configured to operate the traveling devices 4L and 4R with a hydraulic pressure generated when the hydraulic driving device 64 is driven. The hydraulic system for traveling includes a sub pump P1, which is a hydraulic pump to deliver hydraulic fluid, a first traveling motor mechanism 31L, a second traveling motor mechanism 31R, and a traveling driving mechanism 34.

The sub pump P1 is constituted of a constant-displacement gear pump. The sub pump P1 is configured to deliver hydraulic fluid stored in a tank (hydraulic fluid tank). A delivery fluid line 40 through which hydraulic fluid flows is extended from a delivery port of the sub pump P1. A first charging fluid line 41 is connected to a delivery side of the delivery fluid line 40. The first charging fluid line 41 extends to the traveling driving mechanism 34. Of hydraulic fluid delivered from the sub pump P1, the hydraulic fluid to be used for control may be referred to as a pilot fluid, and a pressure of the pilot fluid may be referred to as a pilot pressure.

The traveling driving mechanism 34 is a mechanism configured to drive the first traveling motor mechanism 31L and the second traveling motor mechanism 31R, and includes a drive circuit 34L for driving the first traveling motor mechanism 31L (referred to as a left drive circuit) and a drive circuit 34R for driving the second traveling motor mechanism 31R (referred to as a right drive circuit).

The drive circuits 34L and 34R respectively include traveling pumps 52L and 52R, shift fluid lines 57h and 57i, and respective second charging fluid lines 42. The shift fluid lines 57h and 57i are fluid lines respectively connecting the traveling pumps 52L and 52R to the traveling motors 36L and 36R. The second charging fluid lines 42 are fluid lines connected to the respective shift fluid lines 57h and 57i and configured to supply hydraulic fluid, which is supplied from the sub pump P1, to the shift fluid lines 57h and 57i. Each of the traveling pumps 52L and 52R is constituted of a variable displacement axial pump of swash plate type to be driven by the power of the engine 60. Each of the traveling pumps 52L and 52R includes a pressure receiver portion 52a and a pressure receiver portion 52b on which a pilot pressure is applied, and changes an angle of a swash plate with the pilot pressure applied on the pressure receiver portions 52a and 52b. When an angle of the swash plate is changed, outputs (output rates of the hydraulic fluid) of the traveling pumps 52L and 52R and an output direction of hydraulic fluid can be changed. In other words, the traveling pumps 52L and 52R changes an angles of the swash plates to change a driving forces to be output to the traveling devices 4L and 4R.

The first traveling motor mechanism 31L is a mechanism configured to transmit power to the drive shaft of the traveling device 4L that is installed leftward on the machine body 2. The second traveling motor mechanism 31R is a mechanism configured to transmit power to the drive shaft of the traveling device 4R that is installed rightward on the machine body 2. The traveling motor mechanisms 31L and 31R include the traveling motors 36L and 36R and a speed shifter mechanism.

Each of the traveling motors 36L and 36R is a variable displacement axial pump of swash plate type, for example. The traveling motor 36L is attached to the motor attachment portion 26 located on the left frame portion 21, and provides a traveling power to the traveling device 4L. The traveling motor 36R is attached to the motor attachment portion 26 located on the right frame portion 20, and provides a traveling power to the traveling device 4R. The traveling motors 36L and 36R are motors configured to change a vehicle speed (that is, a rotating speed) between a first speed and a second speed. In other words, the traveling motors 36L and 36R are motors capable of changing a force of propelling the working machine 1, that is, the traveling devices 4L and 4R.

Each speed shifter mechanism includes a swash plate switching cylinder 38a and a traveling switching valve 38b. The swash plate switching cylinder 38a is telescopically movable to change an angle of the corresponding swash plate of each of the traveling motors 36L and 36R. The traveling switching valve 38b is a valve to extend and contract the swash plate switching cylinder 38a in one and the other directions, that is, a two-position switching valve configured to be switched between a first position 39a and a second position 39b. The traveling switching valves 38b are switched by a speed-shifting switching valve 44. The speed-shifting switching valve 44 is connected to the delivery fluid line 40, and is connected to the traveling switching valve 38b of the first traveling motor mechanism 31L and to the traveling switching valve 38b of the second traveling motor mechanism 31R. The speed-shifting switching valve 44 is a two-position switching valve configured to be switched between a first position 44a and a second position 44b. When the speed-shifting switching valve 44 is set to the first position 44a, a pressure of the hydraulic fluid to be applied to the traveling switching valve 38b of the speed shifter mechanism is set as a pressure corresponding to a predetermined speed (for example, a first speed). When the speed-shifting switching valve 44 is set to the first position 44a, a pressure of the hydraulic fluid to be applied to the traveling switching valve 38b is set as another pressure corresponding to another speed (a second peed) faster than the predetermined speed (the first speed). Thus, when the speed-shifting switching valve 44 is in the first position 44a, the traveling switching valves 38b are in the respective first positions 39a, and accordingly the swash plate switching cylinders 38a are contracted to set the traveling motors 36L and 36R in the first speed state. When the speed-shifting switching valve 44 is in the second position 44b, the traveling switching valve 38b is in the second position 39b, and accordingly the swash plate switching cylinder 38a is extended to set the traveling motors 36L and 36R in the second speed state. The shifting of the traveling motors 36L and 36R between the first speed state and the second speed state is controlled by a working controller 70. For example, the working controller 70 is provided with an operation member 58 such as a switch (a speed shifter switch) (see FIG. 8). When the operation member 58 is switched to set the first speed, the working controller 70 outputs a control signal to demagnetize a solenoid of the speed-shifting switching valve 44 to set the speed-shifting switching valve 44 to the first position 44a. When the operation member 58 is switched to set the second speed, the working controller 70 outputs a control signal to magnetize a solenoid of the speed-shifting switching valve 44 to set the speed-shifting switching valve 44 to the second position 44b.

As shown in FIG. 5, the working machine 1 is provided with an operation device 53. The operation device 53 is a device configured to operate the traveling devices 4L and 4R, that is, the first traveling motor mechanism 31L, the second traveling motor mechanism 31R, and the traveling driving mechanism 34. The operation device 53 includes a traveling operation member 54 and a plurality of operation valves 55 (55a, 55b, 55c, and 55d). The plurality of operation valves 55 (55a, 55b, 55c, and 55d) are traveling operation valves.

The traveling operation member 54 is an operation member supported by the operation valves 55, and is configured to swing in a left-and-right direction (a machine width direction) or a fore-and-aft direction. The plurality of operation valves 55 are operated by the common traveling operation member 54, i.e., by the single traveling operation member 54. The plurality of operation valves 55 are actuated according to the swinging of the traveling operation member 54. To the plurality of operation valves 55, hydraulic fluid (the pilot fluid) delivered from the sub pump P1 can be supplied through the delivery fluid line 40. The plurality of operation valves 55 include the operation valve 55a, the operation valve 55b, the operation valve 55c, and the operation valve 55d.

The plurality of operation valves 55 are connected to the traveling driving mechanism 34 (traveling pumps 52L and 52R) via traveling fluid lines 45. The traveling fluid lines 45 include a first traveling fluid line 45a, a second traveling fluid line 45b, a third traveling fluid line 45c, a fourth traveling fluid line 45d, and a fifth traveling fluid line 45e. The first traveling fluid line 45a is a fluid line connected to the pressure receiver portion 52a of the traveling pump 52L. The second traveling fluid line 45b is a fluid line connected to the pressure receiver portion 52b of the traveling pump 52L. The third traveling fluid line 45c is a fluid line connected to the pressure receiver portion 52a of the traveling pump 52R.

The fourth traveling fluid line 45d is a fluid line connected to the pressure receiver portion 52b of the traveling pump 52R. The fifth traveling fluid line 45e is a fluid line that connects the operation valve 55, the first traveling fluid line 45a, the second traveling fluid line 45b, the third traveling fluid line 45c, and the fourth traveling fluid line 45d to each other. The fifth traveling fluid line 45e connects shuttle valves 46 to the operation valves 55 (55a, 55b, 55c, and 55d), respectively.

When the traveling operation member 54 is pivoted forward (in a direction indicated by an arrowed line A1 in FIG. 5), the operation valve 55a is operated so as to apply pilot pressures to the pressure receiver portions 52a of the traveling pumps 52L and 52R to tilt the swash plates of the traveling pumps 52L and 52R in respective normal rotation directions from respective neutral positions, and in this state, the traveling pumps 52L and 52R deliver hydraulic fluid. As the result, the output shafts 35L and 35R of the traveling motors 36L and 36R normally rotate (rotate forward) at a speed proportional to a pivoting extent of the traveling operation member 54, and thus the working machine 1 moves straight forward.

When the traveling operation member 54 is pivoted backward (in a direction indicated by an arrowed line A2 in FIG. 5), the operation valve 55b is operated so as to apply pilot pressures to the pressure receiver portions 52b of the traveling pumps 52L and 52R to tilt the swash plates of the traveling pumps 52L and 52R in respective reverse rotation directions from the respective neutral positions, and in this state, the traveling pumps 52L and 52R deliver hydraulic fluid. As the result, the output shafts 35L and 35R of the traveling motors 36L and 36R reversely rotate (rotate backward) at a speed proportional to a pivoting extent of the traveling operation member 54, and thus the working machine 1 moves straight backward.

When the traveling operation member 54 is pivoted rightward (in a direction indicated by an arrowed line A3 in FIG. 5), the operation valve 55c is operated so as to apply pilot pressures to the pressure receiver portion 52a of the traveling pump 52L and the pressure receiver portion 52b of the traveling pump 52R, respectively, to tilt the swash plate of the traveling pump 52L in the normal rotation direction, and the swash plate of the traveling pump 52R in the reverse rotation direction, respectively. As the result, the output shaft 35L of the traveling motor 36L located on the left side normally rotates and the output shaft 35R of the traveling motor 36R located on the right side reversely rotates, and thus the working machine 1 turns to the right (ultra-pivotal turn). When the traveling operation member 54 is pivoted leftward (in a direction indicated by an arrowed line A4 in FIG. 5), the operation valve 55d is operated so as to apply pilot pressures to the pressure receiver portion 52b of the traveling pump 52L and the pressure receiver portion 52a of the traveling pump 52R, respectively, to tilt the swash plate of the traveling pump 52L in the reverse rotation direction, and the swash plate of the traveling pump 52R in the normal rotation direction, respectively. As the result, the output shaft 35L of the traveling motor 36L located on the left side reversely rotates and the output shaft 35R of the traveling motor 36R located on the right side normally rotates, and thus the working machine 1 turns to the left (ultra-pivotal turn).

When the traveling operation member 54 is pivoted in an oblique direction, the rotational directions and the rotation speeds of the output shafts 35L and 35R of the left traveling motor 36L and the right traveling motor 36R are determined based on a differential pressure between the pilot pressures applied to the pressure receiver portion 52a and the pressure receiver portion 52b, and then the working machine 1 turns right (the right pivotal turn) or left (the left pivotal turn) in forward traveling or reverse traveling.

The working machine 1 may be provided with an anti-stall control valve 48. The anti-stall control valve 48 is located in the fluid line (delivery fluid line 40) between the plurality of operation valves 55 (55a, 55b, 55c, and 55d) and the sub pump P1.

The anti-stall control valve 48 is a proportional solenoid valve having a variable aperture. The anti-stall control valve 48 is capable of setting a pilot pressure (referred to as a primary pilot pressure) applied to the plurality of operation valves 55 (55a, 55b, 55c, and 55d) based on a reduction amount (dropping) ΔE1 of a revolving speed of the engine 60 (referred to as an engine revolving speed). The revolving speed of the engine can be detected by a sensor 91 for detecting an engine revolving speed. The engine revolving speed detected by the sensor 91 is input to the working controller 70.

Figure 7:
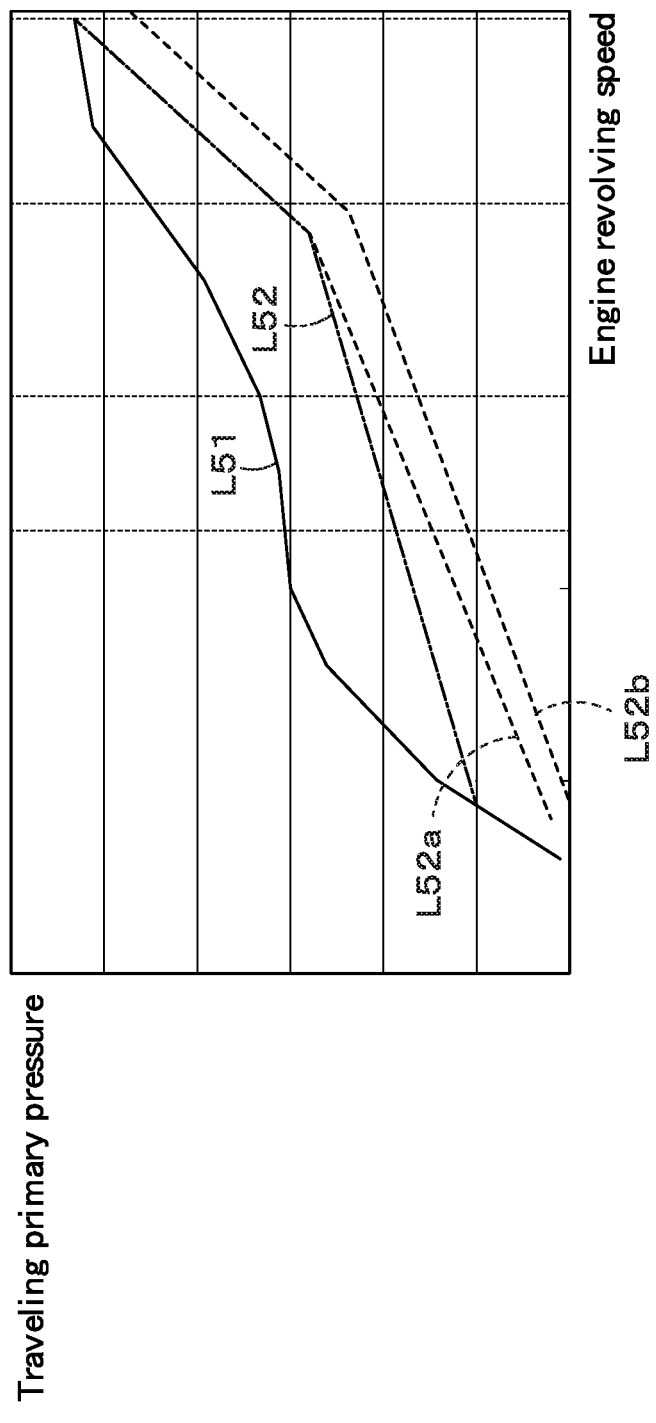
FIG. 7 is a view illustrating setting lines of relationship between an engine revolving speed and a primary traveling pressure.

FIG. 7 shows a relationship between the engine revolving speed, the primary traveling pressure (that is, the primary pilot pressure), and setting lines L51 and L52. The setting line L51 shows a relationship between the engine revolving speed and the primary traveling pressure when a reduction amount ΔE1 is less than a predetermined value (i.e., less than an anti-stall judgment value). The setting line L52 shows a relationship between an engine revolving speed and the primary traveling pressure when the reduction amount ΔE1 is equal to or more than the anti-stall judgment value.

The working controller 70 adjusts an opening aperture of the anti-stall control valve 48 so that the relationship between the engine revolving speed and the primary traveling pressure matches with the reference pilot pressure indicated by the setting line L51 when the reduction amount ΔE1 is less than the anti-stall judgment value. When the reduction amount ΔE1 is equal to or more than the anti-stall judgment value, the working controller 70 adjusts the opening aperture of the anti-stall control valve 48 so that the relationship between the engine revolving speed and the primary traveling pressure matches with the setting line L52, which indicates a pressure lower than the reference pilot pressure. On the setting line L52, the primary traveling pressure for a predetermined engine speed is lower than the primary traveling pressure of the setting line L51. That is, when focusing on the same engine speed, the primary traveling pressure of the setting line L52 is set lower than the primary traveling pressure of the setting line L51. Thus, a pressure of the hydraulic fluid (that is, the pilot pressure) to enter the operation valve 55 is kept low under the control based on the setting line L52. As the result, the swash plate angles of the traveling pumps 52L and 52R are adjusted, and the load applied to the engine is reduced, thereby preventing the engine from stalling. Although FIG. 7 shows the setting line L52 as a single line, the setting line L52 may be considered as a plurality of lines. For example, the setting line L52 may be set for each engine revolving speed. It is preferable that the working controller 70 has data indicating the setting lines L51 and L52 or control parameters such as functions.

Next, the hydraulic system for working will be described.

As shown in FIG. 6, the hydraulic system for working is a system configured to operate the working device 3 and the like. The hydraulic system for working is a system configured to operate the working device 3 with the hydraulic pressure generated when the hydraulic driving device 64 is driven. The hydraulic system for working is provided with a plurality of control valves 51 and the main pump P2 that is a hydraulic pump configured to deliver hydraulic fluid. The main pump P2 is a pump located at a position different from a position of the sub pump P1, and is constituted of a small-displacement gear pump. The main pump P2 is configured to deliver the hydraulic fluid stored in a hydraulic fluid tank. In particular, the main pump P2 delivers hydraulic fluid that mainly operates the hydraulic actuators.

A fluid line 51f is extended from a delivery port of the main pump P2. The plurality of control valves 51 are connected to this fluid line 51f. The plurality of control valves 51 include a boom control valve 51a, a bucket control valve 51b, and an auxiliary control valve 51c. The boom control valve 51a is configured to control the boom cylinder 14, the bucket control valve 51b is configured to control the working tool cylinder 15, and the auxiliary control valve 51c is configured to control the hydraulic actuator of the auxiliary attachment.

Operations of the boom 10 and the working tool 11 can be performed by a working operation member 37 included in the operation device 43. The working operation member 37 is an operation member supported by a plurality of operation valves 59 and configured to swing in a left-and-right direction (that is, the machine width direction) or the fore-and-aft direction. By operating to tilt the working operation member 37, the operation valves 59 located on the lower portion of the working operation member 37 can be operated.

The plurality of operation valves 59 are fluidly connected to the plurality of control valves 51 via a plurality of working fluid lines 47 (47a, 47b, 47c, and 47d), respectively. In particular, the operation valve 59a is connected to the boom control valve 51a through the working fluid line 47a. The operation valve 59b is connected to the boom control valve 51a through the working fluid line 47b. The operation valve 59c is connected to the bucket control valve 51b through the working fluid line 47c. The operation valve 59d is connected to the bucket control valve 51b through the working fluid line 47d. The plurality of operation valves 59a to 59d are each capable of setting a pressure of the hydraulic fluid to be delivered according to an operation of the working operation member 37.

When the working operation member 37 is tilted forward, the operation valve 59*a* is operated, and the pilot pressure is output from the operation valve 59*a*. This pilot pressure is applied to a pressure receiver portion of the boom control valve 51*a*, and the hydraulic fluid entering the boom control valve 51*a* is supplied to a rod side chamber of the boom cylinder 14, thus the boom 10 is lowered.

When the working operation member 37 is tilted backward, the operation valve 59*b* is operated, and a pilot pressure is output from the operation valve 59*b*. This pilot pressure is applied to another pressure receiver portion of the boom control valve 51*a*, and the hydraulic fluid entering the valve 51*a* is supplied to a bottom side chamber of the boom cylinder 14, thus the boom 10 is raised.

That is, the boom control valve 51*a* is capable of controlling a flow rate of the hydraulic fluid flowing to the boom cylinder 14 according to a pressure of the hydraulic fluid set through an operation of the working operation member 37 (a pilot pressure set by the operation valve 59*a* and a pilot pressure set by the operation valve 59*b*).

When the working operation member 37 is tilted rightward, the operation valve 59*c* is operated, and the pilot pressure is applied to a pressure receiver portion of the bucket control valve 51*b*. As the result, the bucket control valve 51*b* is operated in a direction to extend the working tool cylinder 15, and the working tool 11 performs the dumping movement at a speed proportional to a tilting amount of the working operation member 37.

When the working operation member 37 is tilted leftward, the operation valve 59*d* is operated, and the pilot fluid is applied to a pressure receiver portion of the bucket control valve 51*b*. As the result, the bucket control valve 51*b* is operated in a direction to contract the working tool cylinder 15, and the working tool 11 performs the scooping movement at a speed proportional to a tilting amount of the working operation member 37.

That is, the bucket control valve 51*b* is capable of controlling a flow rate of the hydraulic fluid flowing in the working tool cylinder 15 according to a pressure of the hydraulic fluid set through an operation of the working operation member 37 (a pilot pressure set by the operation valve 59*c* and a pilot pressure set by the operation valve 59*d*). That is, the operation valves 59*a*, 59*b*, 59*c*, and 59*d* change a pressure of hydraulic fluid according to an operation of the working operation member 37, and supply the changed hydraulic fluid to the control valves such as the boom control valve 51*a*, the bucket control valve 51*b*, and the auxiliary control valve 51*c*.

Figure 8:
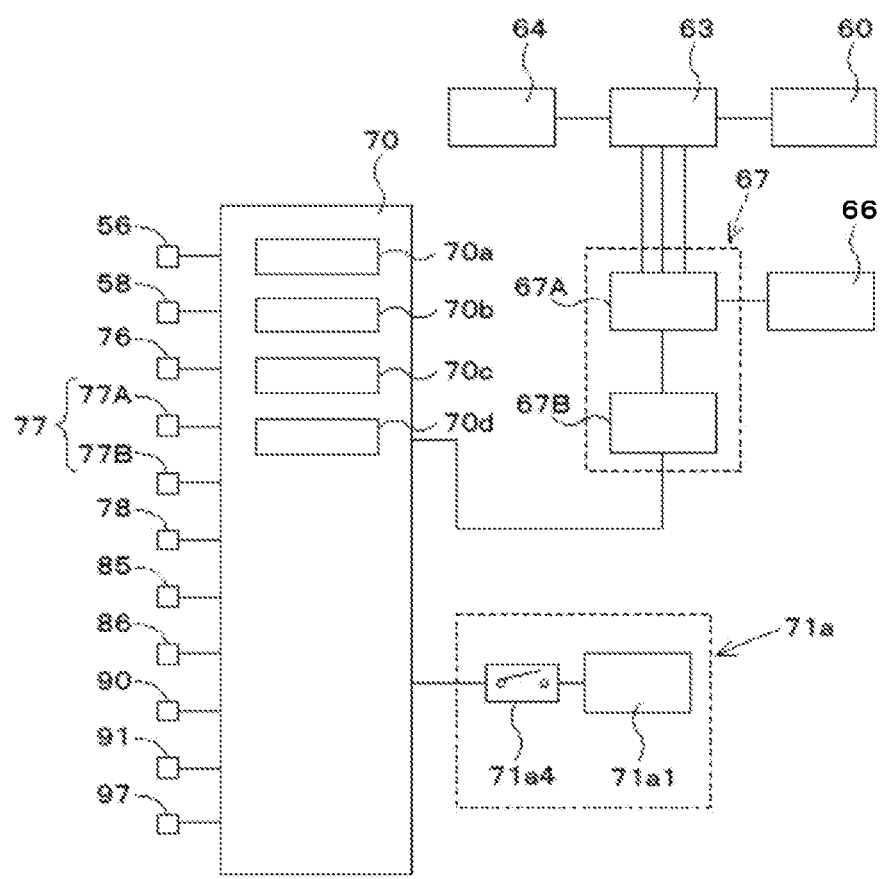
FIG. 8 is a view illustrating a control block diagram of the working machine.

The auxiliary attachments can be operated by a switch 56 provided in the vicinity of the driver seat 7 (see FIG. 8). The switch 56 is constituted of a tiltable seesaw switch, a slidable slide switch, or a depressable push switch. An operation of the switch 56 is input to the working controller 70. The first solenoid valve 56*a* and the second solenoid valve 56*b*, which are constituted of solenoid valves or the like, have variable openings according to an operation extent of the switch 56. As the result, the pilot fluid is supplied to the auxiliary control valve 51*c* connected to the first solenoid valve 56*a* and the second solenoid valve 56*b*, and an auxiliary actuator of the auxiliary attachment is actuated by hydraulic fluid supplied from the auxiliary control valve 51*c*.

As shown in FIG. 8, operation extents of the operation members (the working operation member 37, the traveling operation member 54) can be detected by operation detectors 77. The operation detectors 77 are operably connected to the working controller 70 to be described later. The operation detectors 77 include a first operation detector 77A and a second operation detector 77B. The first operation detector 77A detects an operation extent of the working operation member 37 (referred to as a working operation extent). The second operation detector 77B detects an operation extent of the traveling operation member 54 (referred to as a traveling operation extent). The first operation detector 77A and the second operation detector 77B are position sensors or the like that are configured to detect positions of the operation members.

FIG. 8 shows a control block diagram in the working machine 1. As shown in FIG. 8, the power controller 67 is electrically connected to the working controller 70. The power controller 67 includes an inverter 67A and an inverter control unit 67B.

The inverter 67A, for example, includes a plurality of switching elements, and converts a direct current into an alternating current by switching the switching elements or the like. The inverter 67A is electrically connected to the motor generator 63 and the battery 66. The inverter control unit 67B is constituted of a CPU, electrical and electronic circuits, or the like. When a predetermined signal is output to the inverter control unit 67B, the inverter control unit 67B operates the motor generator 63 as either the motor or as the generator. An amount (remaining amount) of energy stored in the battery 66 can be detected by a charging detection sensor 97 provided in the battery 66.

The working controller 70 is a device configured to perform various controls of the working device, and is constituted of a CPU, an electrical and/or electronic circuit, or the like. The working controller 70 performs a control (that is, the hydraulic control) relating to a hydraulic pressure (that is, the hydraulic fluid). In the hydraulic control, the working controller 70 magnetizes and demagnetizes solenoids of the speed-shifting switching valve 44, the first solenoid valve 56*a*, and the second solenoid valve 56*b*, as described above. The working controller 70 also operates as a controller configured to control the power controller 67. The working controller 70 outputs an assist command to the inverter control unit 67B, and the inverter control unit 67B operates the motor generator 63 as the motor. The working controller 70 outputs a power generation command to the inverter control unit 67B, and the inverter control unit 67B operates the motor generator 63 as the generator. That is, under the control by the working controller 70, the motor generator 63 can perform either one of the assisting operation to assist the driving of the engine 60 and the generating operation to operate as a generator with the power of the engine 60 to generate electric power. The working controller 70 sets either one of a powering torque of the motor generator 63 in the assisting operation and the regenerating torque of the motor generator 63 in the generating operation, and issues a command about the set torque to the power controller 67.

When the motor generator 63 performs the assisting operation, powers of the engine 60 and the motor generator 63 are transmitted to the hydraulic driving device 64. When the motor generator 63 performs the generating operation, a power of the engine 60 is transmitted to the hydraulic driving device 64, and an electric power generated by the motor generator 63 is charged to the battery 66. The motor generator 63 is driven by the electric power charged in the battery 66.

In the above-mentioned embodiment, the working controller 70 and the electric power controller 67 are separately configured, but may be integrally configured and are not limited to the configuration of the above-mentioned embodiment.

The working controller 70 includes a memory unit 70a, a powering torque setting unit 70b, a regenerating torque setting unit 70c, and an operation control unit 70d. The memory unit 70a is constituted of non-volatile memory or the like. The powering torque setting unit 70b, the regenerating torque setting unit 70c, and the operation control unit 70d are constituted of electrical and/or electronic circuits provided in the working controller 70, computer programs or the like stored in a CPU, or the like. The memory unit 70a, the powering torque setting unit 70b, the regenerating torque setting unit 70c, and the operation control unit 70d may be provided in the power controller 67.

Figure 9:
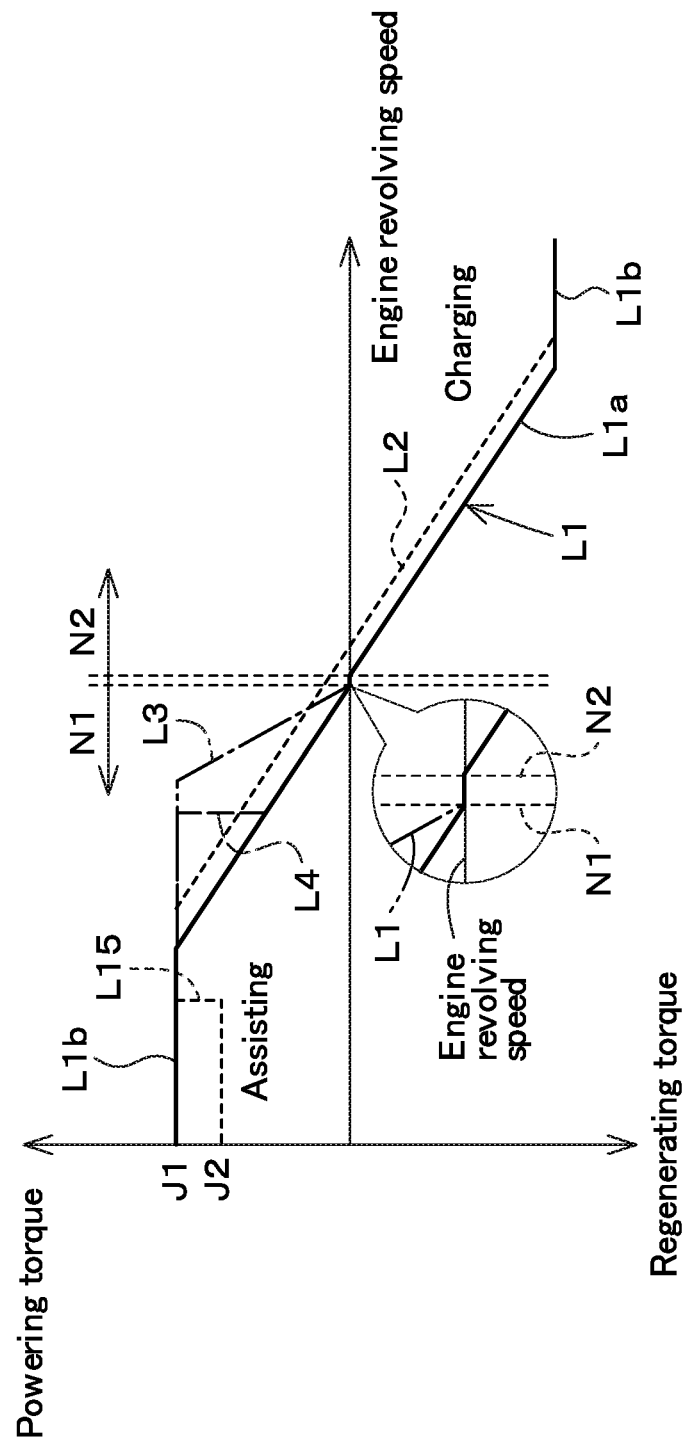
FIG. 9 is a view illustrating an example of a control map.

The memory unit 70a stores control information used when the motor generator 63 performs either the assisting operation or the charging operation, for example, stores a control map shown in FIG. 9. The control map shows a relationship between a revolving speed of the engine 60 (that is, the engine revolving speed) and the selection between the assisting operation and the charging operation (that is, the operation selection), a relationship between the engine revolving speed and a powering torque in the assisting operation, and the relationship between the engine revolving speed and the regenerating torque in the charging operation. In the above-mentioned embodiment, a relationship between the engine revolving speed and the switching of operation, a relationship between the engine revolving speed and the powering torque in assisting operation, and a relationship between the engine revolving speed and the regenerating torque in the charging operation may be shown by control tables, parameters, functions, or the like, which are not limited thereto.

The powering torque setting unit 70b sets the powering torque used when the assisting operation is performed. As shown in FIG. 9, the powering torque setting unit 70b refers to the control information such as the control map stored in the memory portion 70a, and sets the powering torque relative to the engine revolving speed with use of a standard line L1, for example.

The regenerating torque setting unit 70c sets the regenerating torque used when the generating operation is performed. As shown in FIG. 9, the regenerating torque setting unit 70c refers to control information in the same way as the powering torque setting unit 70b, and sets the regenerating torque relative to the engine revolving speed with use of the standard line L1, for example. The standard line L1 includes a sloping line L1a, in which the torque varies with the engine revolving speed, and a constant line L1b, in which the torque is constant regardless of the engine revolving speed.

The operation control unit 70d executes the assisting operation by outputting the powering torque to the power controller 67 when the engine revolving speed is a first revolving speed N1 or lower, the powering torque being set by the powering torque setting unit 70b, and executes the generating operation by outputting the regenerating torque to the power controller 67 when the engine revolving speed is a second revolving speed N2 higher than the first revolving speed or higher, the regenerating torque being set by the regenerating torque setting unit 70c.

Figure 10:
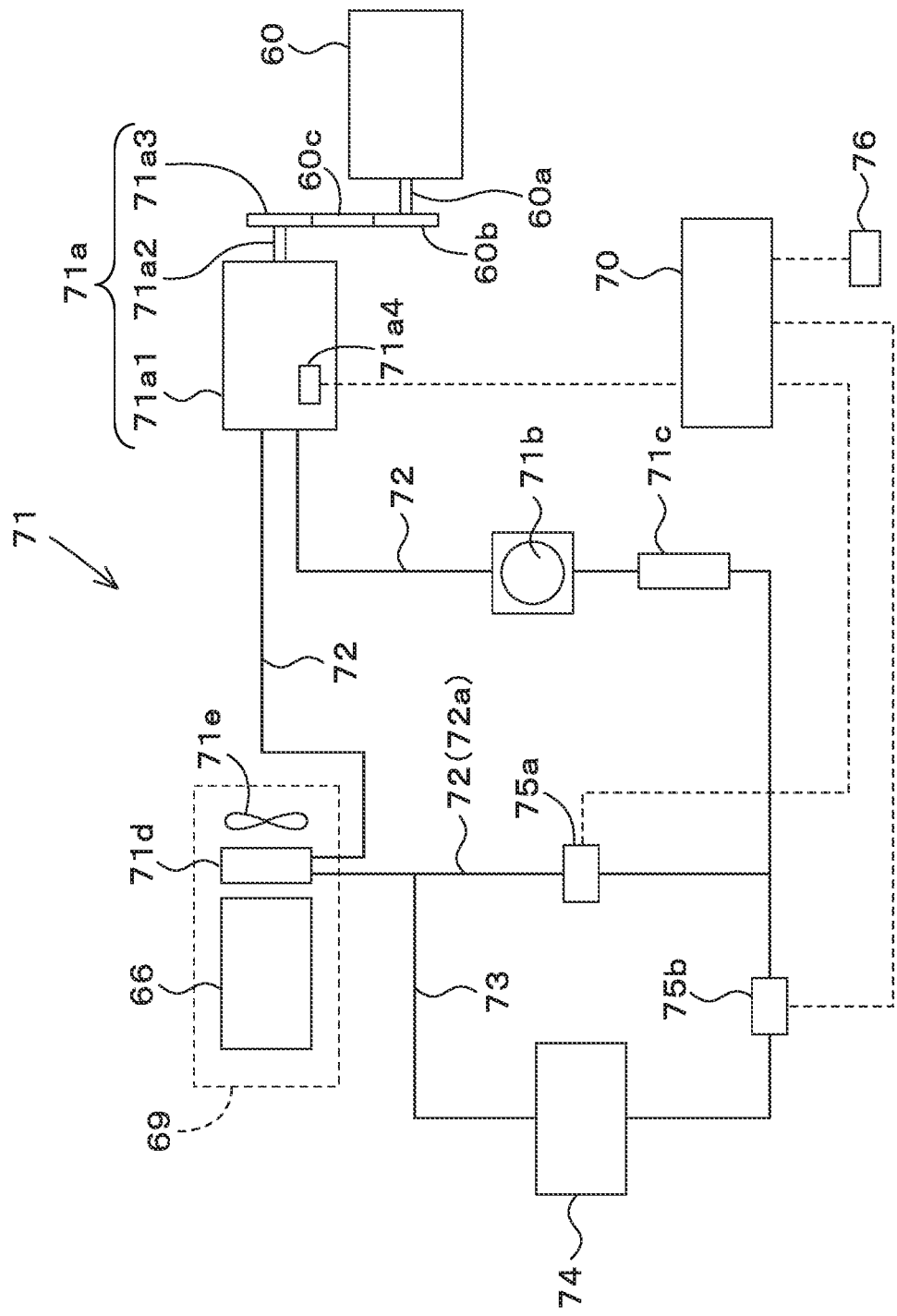
FIG. 10 is a view illustrating a cooling device.

As shown in FIG. 10, the working machine 1 is provided with a cooling device 71 configured to cool the battery 66. The cooling device 71 is a device configured to be operated by power of the engine 60 to apply, to the battery 66, a cooling air whose temperature is lowered by a refrigerant, thereby cooling the battery 66, for example.

The cooling device 71 is stopped based on an operating state of either one of the hydraulic driving device 64, the working device 3, and the traveling devices 4L and 4R. For example, the cooling device 71 stops when an output of the hydraulic driving device 64 is a predetermined output or more, when a load generated during operation of the working device 3 is a predetermined load or more, or when a load generated during operation of the traveling devices 4L and 4R is a predetermined load or more. In this regard, the cooling device 71 is activated when the output of the hydraulic driving device 64 is less than the predetermined output, when the load generated during of the working device 3 is less than the predetermined load, or when the load generated during operation of the traveling devices 4L and 4R is less than the predetermined load.

A structure and operation of the cooling device 71 will be described in detail below.

The cooling device 71 includes a compressor 71a, a condenser 71b, a receiver 71c, an evaporator 71d, and a cooling fan 71e. The compressor 71a and the condenser 71b are connected to each other by a cooling line 72 such as a pipe, and the receiver 71c and the evaporator 71d are also connected to each other by another cooling line 72. The evaporator 71d and the cooling fan 71e are housed in a case 69 that houses the battery 66.

The compressor 71a includes a main body 71a1, a drive shaft 71a2, and a pulley 71a3 that rotates with the drive shaft 71a2. A belt 60c wound on a pulley 60b that rotates according to rotation of the output shaft 60a of the engine 60 is wound on the pulley 71a3. Thus, a rotational power from the output shaft 60a of the engine 60 is transmitted to the main body 71al through the pulley 60b, the belt 60c, the pulley 71a3, and the drive shaft 71a2. The compressor 71a is provided with a switch 71a4 configured to be switched between an ON state and an OFF state. The compressor 71a is activated with the electric power supplied when the switch 71a4 is turned ON under a condition where the power is transmitted to the main body 71a1. The compressor 71a is stopped with the supply of electric power stopped when the switch 71a4 is turned off under a condition the power is transmitted to the main body 71al. That is, the switch 71a4 is an electric power switch.

When the compressor 71a is activated, refrigerant in the cooling line 72 is compressed and output to the condenser 71b. The compressor 71a, when activated, compresses the refrigerant and delivers the compressed refrigerant to the condenser 71b through the cooling line 72.

The condenser 71b is provided with a cooling fan to lower a temperature of the refrigerant.

The refrigerant that has passed through the condenser 71b flows to the evaporator 71d through the receiver 71c, and refrigerant that has passed through inside of the evaporator 71d returns to the compressor 71a.

As shown in FIG. 10, a cooling line 73 may be branched from a section 72a of the cooling line 72 between the receiver 71c and the evaporator 71d, and may be connected to an air conditioner 74 provided in the cabin 5. On-off valves 75a and 75b constituted of solenoid valves or the like are connected to the section 72a of the cooling line 72 and the cooling line 73. The on-off valves 75a and 75b can be switched by the working controller 70. The on-off valve 75b is closed when the on-off valve 75a is opened. The on-off valve 75b is opened when the on-off valve 75a is closed. In this manner, the refrigerant in the cooling lines 72 and 73 is allowed to selectively flow either to the side for cooling the battery 66 (to the evaporator 71d) or to the air conditioner 74.

As shown in FIG. 8, the working machine 1 is provided with a load detection unit (load detector) 76. The load detector 76 detects an operating state of at least one of the hydraulic driving device 64, the working device 3, and the traveling devices 4L and 4R, that is, detects the load. For example, the load detector 76 is a pressure detector sensor configured to detect a pressure of hydraulic fluid. The load detector 76 is operably connected to the working controller 70.

The load detector (that is, the pressure detection sensor) 76 is provided on each of the speed-shifting fluid lines 57h and 57i, for example. The load detectors 76 provided on the respective speed-shifting fluid lines 57h and 57i can detect respective pressures after operations of the traveling pumps 52L and 52R (referred to as pump-output pressures), and the pump-output pressures can be considered as loads on the traveling pumps 52L and 52R (that is, output loads) or as loads on the traveling devices 4L and 4R (that is, output loads).

The load detector (that is, the pressure detection sensor) 76 may be provided on a fluid line connecting the hydraulic cylinder of the working device 3 to the control valve 51 (that is, the boom control valve 51a, the bucket control valve 51b). In this case, due to the load detector (that is, the pressure detection sensor) 76, the pressures of the hydraulic cylinders (that is, the boom cylinder 14, the working tool cylinder 15) of the working device 3 during the working (referred to as the working pressure) can be considered as a load on the working device 3 (referred to as the output load).

Figure 11A:
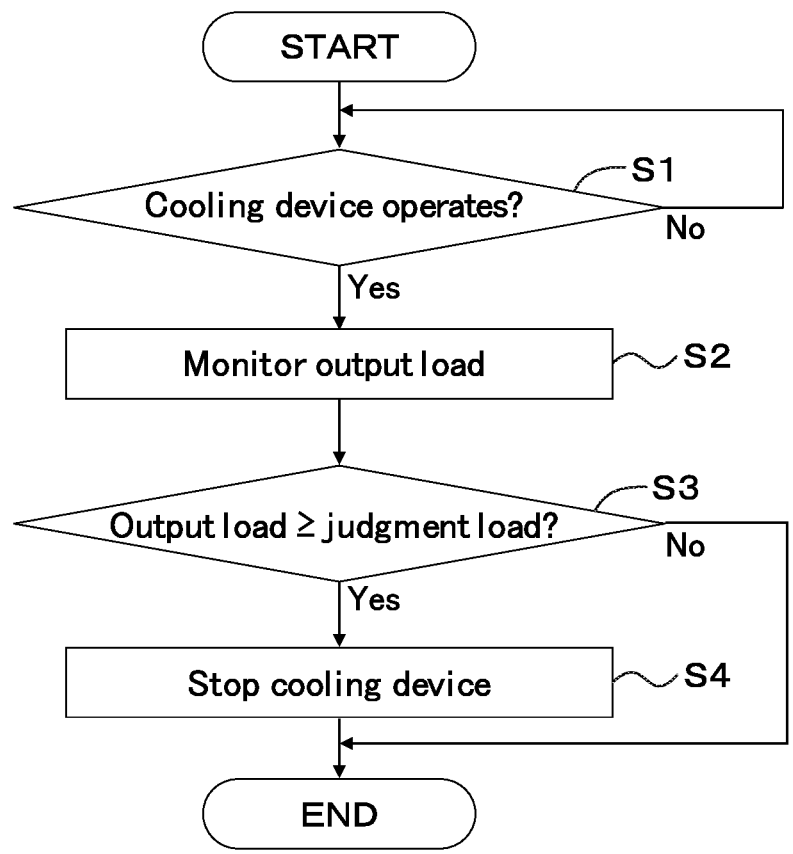
FIG. 11A is a view illustrating an example of a process in the cooling device.

As shown in FIG. 11A, the working controller 70 judges whether the cooling device 71 (that is, the compressor 71a) is operated or not (S1). When the cooling device 71 is operated (S1, Yes), the working controller 70 monitors the output load on any of the traveling pumps 52L and 52R, the traveling devices 4L and 4R, and the hydraulic cylinders of the working device 3 (S2).

When the output load is equal to or larger than a predetermined judgment load (S3, Yes), the working controller 70 stops the cooling device 71 (that is, the compressor 71a) by switching the switch 71a4 from ON to OFF (S4). On the other hand, when the output load is less than the judgment load (S3, No), the working controller 70 keeps (maintains) the switch 71a4 in the ON state. The judgment load is a value to be used to judge whether or not an excessive load is applied to the working machine 1 in either the working or the traveling.

In the above-mentioned embodiment, it is judged whether or not the output load on any of the traveling pumps 52L and 52R, the traveling devices 4L and 4R, and the hydraulic cylinders of the working device 3 is the judgment load or more. Additionally, the cooling system 71 may be stopped when a combined total load on at least two output loads is the judgment load or more.

In addition, the cooling device 71 may be stopped when an operation extent of the operation member (that is, the working operation member 37 or the traveling operation member 54) is a predetermined extent or more.

Figure 11B:
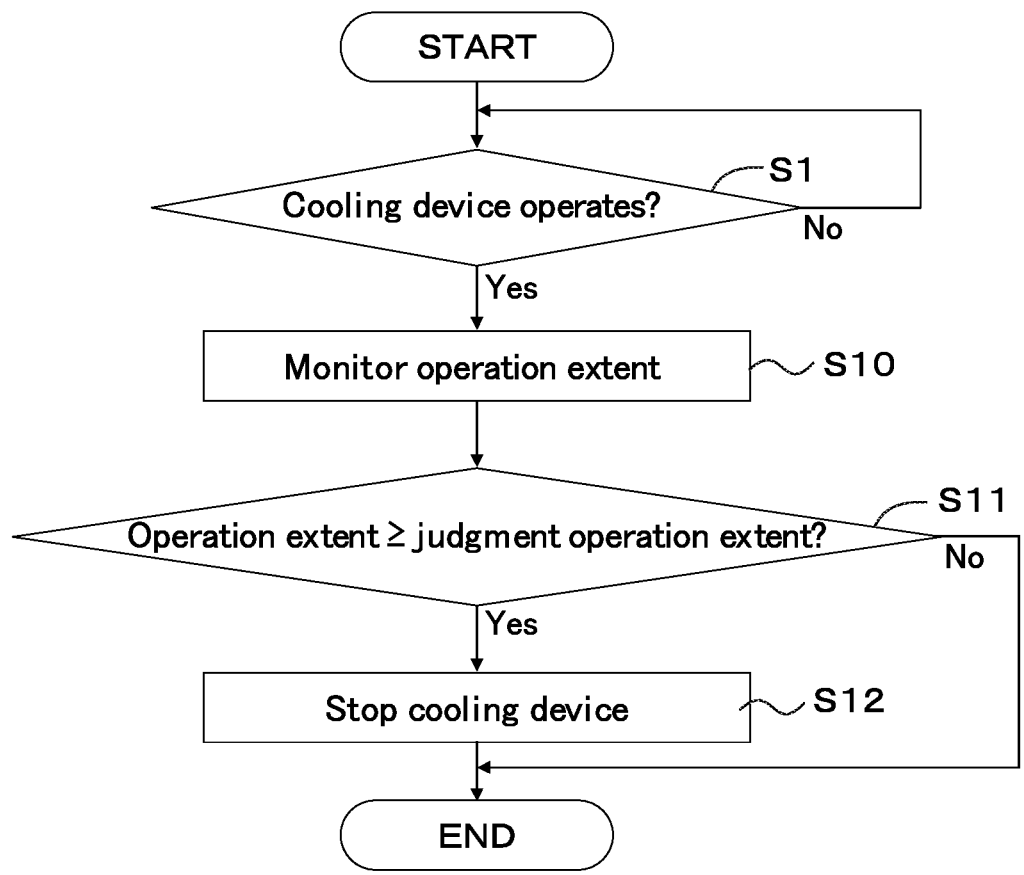
FIG. 11B is a view illustrating a different process in the cooling device from FIG. 11A.

As shown in FIG. 11B, when the cooling device 71 (that is, the compressor 71a) is operated (S1, Yes), the working controller 70 monitors either the working operation extent of the working operation member 37 detected by the first operation detector 77A or the traveling operation extent of the traveling operation member 54 detected by the second operation detector 77B (S10). When either the working operation extent or the traveling operation extent is the predetermined judgment operation extent or more (S11, Yes), the working controller 70 switches the switch 71a4 from the ON state to the OFF state (S12). On the other hand, when each of the working operation extent and the traveling operation extent is less than the judgment operation extent (S11, No), the working controller 70 keeps (maintains) the switch 71a4 in the ON state. The judgment operation extent is a value to be used to judge whether or not the working device 3 or the traveling devices 4L and 4R should be operated quickly.

In the above-described embodiment, it is judged whether or not either the working operation extent or the traveling operation extent is the judgment operation extent or more. Additionally, the cooling device 71 may be stopped when the total operation extent which is the sum of at least two extents, the working operation extent and the traveling operation extent, is the judgment load or more.

It may also be judged, based on a temperature of the battery 66, whether or not to stop the cooling device 71. The temperature of the battery 66 is detected by the temperature detector 78. The temperature detector 78 is provided inside the case 69, and detects the temperature of the battery 66. The temperature detector 78 is connected to the working controller 70.

Figure 11C:
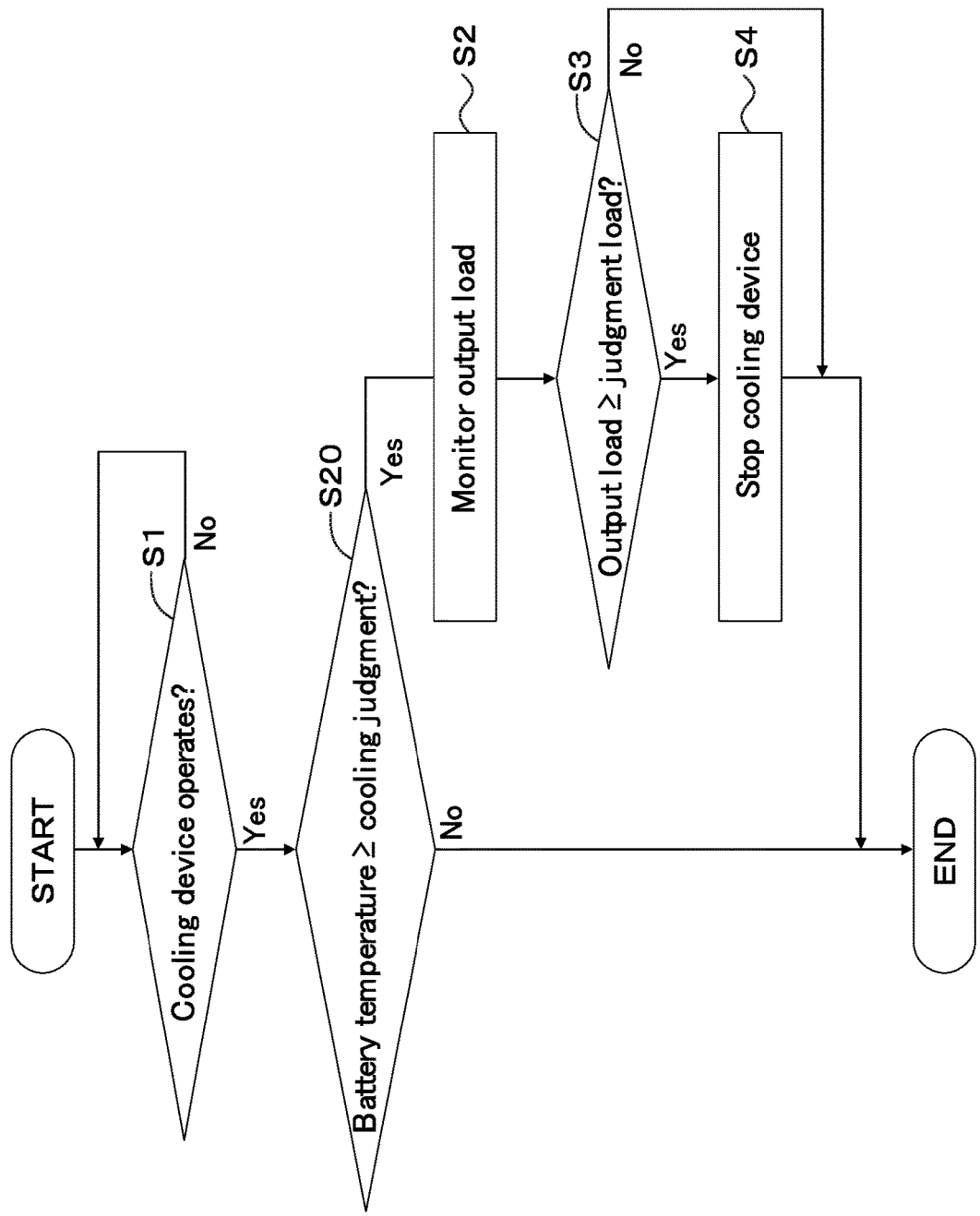
FIG. 11C is a view illustrating another different process in the cooling device from FIG. 11A and FIG. 11B.

As shown in FIG. 11C, when the cooling device 71 is operated (S1, Yes), the working controller 70 judges whether or not a temperature (referred to as a battery temperature) detected by the temperature detector 78 is the cooling judgment value or higher (S20). The cooling judgment value is a value used to determine whether or not the battery 66 needs to be cooled. The cooling judgment value is set as 50° C. or higher, for example. The cooling judgment value is not limited thereto.

When the battery temperature is the cooling judgment value or higher (S20, No), the working controller 70 keeps (maintains) the switch 71a4 in the ON state. On the other hand, when the battery temperature is less than the cooling judgment value (S20, Yes), the working controller 70 monitors the output load (S2) similar to the process in FIG. 11A, and when the output load is the judgment load or more (S3, Yes), the cooling device 71 is stopped (S4). On the other hand, when the output load is less than the judgment load (S3, No), the working controller 70 keeps (maintains) the switch 71a4 in the ON state.

In the present embodiment, the cooling device 71 (that is, the compressor 71a) is stopped by switching the switch 71a4 between the ON state and the OFF state. Alternatively, the working controller 70 may engage or disengage an electromagnetic clutch interposed between the driving shaft 71a2 of the compressor 71a and the output shaft 60a to stop the cooling device 71 (that is, the compressor 71a).

The working machine 1 includes the machine body 2, the engine 60, the motor generator 63, the battery 66, the cooling device 71, the hydraulic driving device 64, the working device 3, and the traveling devices 4L and 4R, and the cooling device 71 is stopped based on the operating state of any one of the hydraulic driving device 64, the working device 3, and the traveling devices 4L and 4R. According to this configuration, a driving power of the engine 60 can be secured by stopping the cooling device 71, and a storing capacity of the battery 66 can be secured without lowering the powering torque or the like on the motor generator 63.

The working machine 1 includes the load detection unit (load detector) 76 configured to detect a load on any of the hydraulic driving device 64, the working device 3, and the traveling devices 4L and 4R—The cooling device 71 is stopped when the load detected by the load detection unit (that is, the load detector) 76 is the predetermined load or more. Accordingly, when an output load is applied on any of the hydraulic driving device 64, the working device 3, and the traveling devices 4L and 4R, the cooling device 71 is stopped to secure a driving force of the engine 60.

The working device 3 includes the operation member (the working operation member 37 or the traveling operation member 54) for operating either the working device 3 or the traveling devices 4L and 4R. The cooling device 71 is stopped when the operation extent of the operation member (the working operation member 37 or the traveling operation member 54) is the predetermined extent or more. According to this configuration, the cooling device 71 can be efficiently stopped when the operation extent of the operation member is the predetermined extent or more and the power outputting is required. That is, an operation of the cooling device 71 can be maintained or stopped in synchronization with the operation extent of the operation member.

The working machine 1 includes the temperature detector 78 configured to detect the temperature of the battery 66. The cooling device 71 is not stopped when the temperature detected by the temperature detector 78 is a predetermined temperature or more. According to this configuration, when the temperature of the battery 66 is high, the cooling by the cooling device 71 can be given priority.

The cooling device 71 includes the evaporator 71*d* through which the refrigerant for cooling the battery 66 flows, and the compressor 71*a* configured to compress the refrigerant that has flown through the evaporator 71*d*. The compressor 71*a* is selectively stopped based on its operating state. According to this configuration, the cooling device 71 can be entirely and easily stopped by stopping compression of the refrigerant by the compressor 71*a*.

Figure 12:
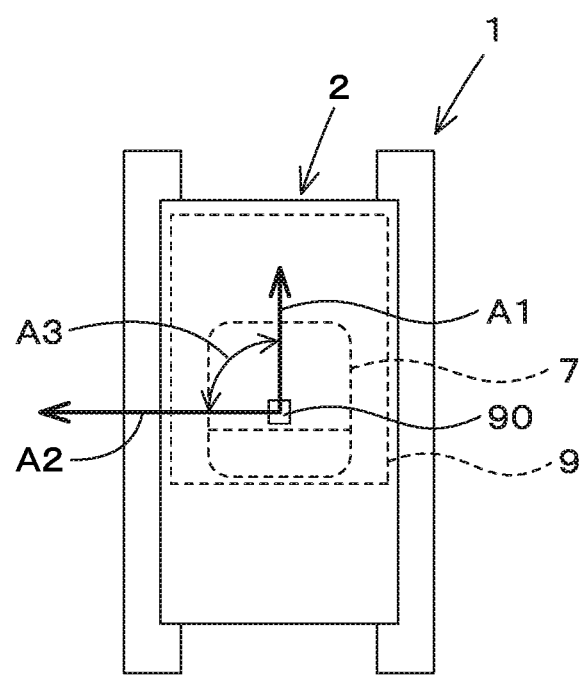
FIG. 12 is a schematic view of a machine body on which an inertial measurement unit is mounted.

As shown in FIGS. 8 and 12, the working machine 1 includes an inertial measurement unit (IMU) 90 configured to measure an inertial force of the machine body 2.

The inertial measurement unit 90 is attached, for example, below the driver seat 7, inside the cabin 5, on the top plate (that is, an outer roof) of the cabin 5, or on the bottom frame portion 23. The position of the inertial measurement unit 90 is not limited to of the above-mentioned positions in the embodiment. The inertial measurement unit 90 includes a gyro sensor that detects an angular velocity in three axes (that is, the X, Y, and Z axes) and an angular accelerometer that detects an angular acceleration. In other words, the inertial measurement unit 90 is a device that includes two acceleration sensors, i.e., the gyro sensor and the angular accelerometer. The inertial measurement unit 90 to be provided in the working machine 1 is not limited to that having the two acceleration sensors, and may be provided with only a single gyro sensor.

The inertial measurement unit 90 is capable of detecting a roll angle, a pitch angle, a yaw angle, and the like of the machine body 2. The inertial measurement unit 90 is electrically connected to the working controller 70.

The working controller 70 estimates, based on the inertial force of the machine body 2 measured by the inertial measurement unit 90, what kind of traveling state the machine body 2 is in, and selectively sets either the assisting operation or the generating operation based on the estimated traveling state.

The setting of the assisting operation and the power generation command based on the inertial force detected by the inertial measurement unit 90 will be described below.

As shown in FIG. 12, the working controller 70 refers to a fore-and-aft directional acceleration (referred to as a first acceleration) A1 of the machine body 2, a left-and-right (or width) directional acceleration (referred to as a second acceleration) A2 of the machine body 2, and a yaw rate A3 of the working machine 1 (that is, the machine body 2), which are measured by the inertial measurement unit 90.

As shown in FIG. 13, when the first acceleration A1 is not less than a threshold thereof, the working controller 70 estimates that the machine body 2 is in a straight traveling state where the machine body 2 is traveling straight. When the first acceleration A1 is less than the threshold, the working controller 70 estimates that the machine body 2 is in a non-straight traveling state defined as any traveling state other than the straight traveling state.

The working controller 70 estimates, based on the second acceleration A2 and the yaw rate A3, whether the machine body 2 is in a turning state where the machine body 2 is turning or not. For example, the working controller 70 estimates that the machine body 2 is turning in a way referred to as first turning when the second acceleration A2 is the threshold thereof or larger and the yaw rate A3 is a threshold thereof or larger. The working controller 70 also estimates that the machine body 2 is turning in a way referred to as second turning when the second acceleration A2 is less than the threshold thereof and the yaw rate A3 is the threshold thereof or larger. On the other hand, when the second acceleration A2 is less than the threshold thereof and the yaw rate A3 is also less than the threshold thereof, the working controller 70 estimates that the machine body 2 is in a state other than the turning state. That is, the working controller 70 distinguishingly estimates, based on the second acceleration A2 and the yaw rate A3, either one of the two kinds of turnings, e.g., the ultra-pivotal turn and the pivotal turn, as well as whether the machine body 2 is in a state other than the turning.

As described above, the working controller 70 is configured to estimate, based on an inertial force, what kind of traveling state (such as the straight traveling, the first turning, the second turning, or a state other than the turning) the machine body 2 is in. The working controller 70 makes various settings in the assisting operation or the power generation command in correspondence to the traveling state (the straight traveling, the first turning, the second turning, or the state other than the turning) in which the machine body 2 is.

Either the powering torque setting unit 70*b* or the regenerating torque setting unit 70*c* changes the setting of either the powering torque or the regenerating torque based on the inertial force of the machine body 2. For example, as shown in FIG. 9, when, in consideration of the traveling state of the machine body 2 estimated based on the inertial force of the machine body 2, the powering torque setting unit 70*b* or the regenerating torque setting unit 70*c* needs to increase the torque at a given engine speed in the assisting operation or charging operation to a torque larger than that on the standard line L1 at the same engine speed, the torque on the slope line L1*a* of the standard line L1 is changed to a torque on a correction line L2 indicating variation of given by shifting the slope line L1*a* of the standard line L1 to the higher side of an engine revolving speed when In addition, when, in consideration of the traveling state of the machine body 2 estimated based on an inertial force of the machine body 2, the torque per unit engine revolution needs to be larger than that on the standard line L1, the powering torque setting unit 70*b* changes the torque to a torque on a correction line L3. When instantaneously increasing a torque is needed, the powering torque setting unit 70*b* changes the torque to a torque on a correction line L4.

For example, when the traveling state is estimated as the straight traveling, each of the powering torque setting unit 70*b* and the regenerating torque setting unit 70*c* sets a torque based on the standard line L1. When the traveling state is estimated as the turning (the ultra-pivotal turn, the pivotal turn), the powering torque setting unit 70b sets a torque based on the correction line L3. In particular, when an instantaneous torque is required, the powering torque setting unit 70b sets a torque based on the correction line L4. When the traveling state is estimated as a state other than the turning, each of the powering torque setting unit 70b and the regenerating torque setting unit 70c sets a torque based on the correction line L2. The above-mentioned examples are just examples, and are not limited.

The correction lines L2 to L4 may be prepared in advance as control information in the memory unit 70a, may be calculated by the reduction amount ΔE1 of the engine revolving speed, or may be obtained by a formula (function) so that their slopes become larger than that of the standard line L1 in correspondence to a difference between the first revolving speed N1 and the second revolving speed N2. In the correction lines L2 to L4, the rate (slope) of increasing of the torque may be set according to a magnitude of the inertial force.

Figure 14:
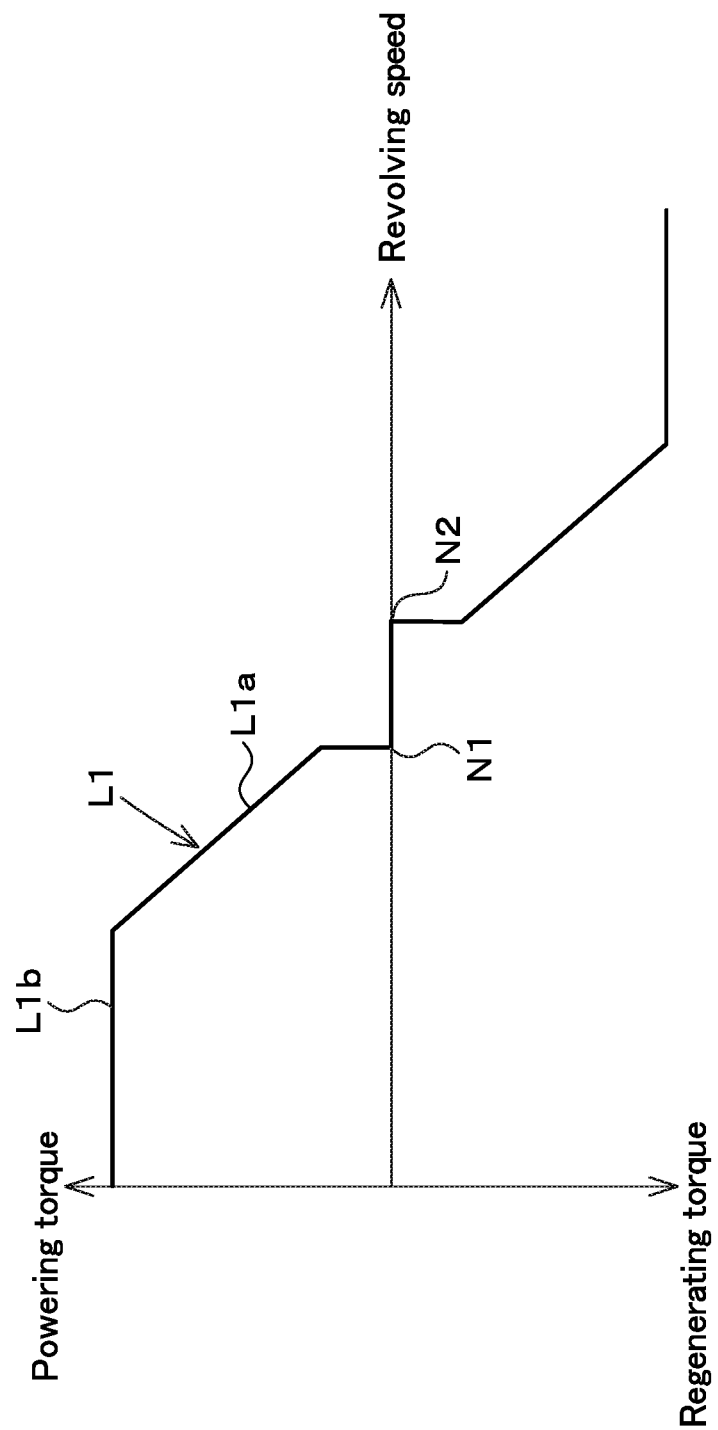
FIG. 14 is a view illustrating an example of changing a first revolving speed N1 and a second revolving speed N2 according to magnitude of an inertial force of the machine body.

Alternatively, as shown in FIG. 14, the working controller 70 may change the first revolving speed N1 and the second revolving speed N2 indicated by the standard line L1 based on a magnitude of the inertial force of the machine body 2. As shown in FIG. 14, while an inclination of the slope line L1a of the standard line L1 is not changed, the larger the inertial force becomes, the more the first and second revolving speeds N1 and N2 are shifted in the direction lowering the revolving speed. The only requirement is that a torque or the like is set according to the inertial force detected by the inertial measurement unit 90, and the setting is not limited to the above-mentioned embodiment.

The working machine 1 includes the acceleration sensor configured to measure the acceleration of the machine body 2, and the controller (that is, the working controller 70, the power controller 67) configured to selectively set either the assisting operation or the generating operation based on the acceleration of the machine body 2 measured by the acceleration sensor. According to this configuration, even when the working machine 1 shows various behaviors in the working, the inertial measurement unit 90 is capable of detecting the behaviors in the working, so that the settings such as the torque can be easily made based on the operations of the working machine 1.

The controller (that is, the working controller 70, the power controller 67) estimates what kind of traveling state the machine body 2 is in based on the acceleration of the machine body 2 measured by the acceleration sensor, and selectively sets either the assisting operation or the generating operation based on the traveling state. According to this configuration, the inertial measurement unit 90 is adaptable for estimating the various traveling states, and for quickly judging, based on the estimated traveling state, whether to perform the assisting operation or the generating operation.

The controller d (that is, the working controller 70, the power controller 67) estimates that the machine body 2 is in the straight traveling state where the machine body 2 is traveling straight when the fore-and-aft directional acceleration of the machine body 2 is not less than the threshold. The controller estimates that the machine body 2 is in the non-straight traveling state defined as any traveling state other than the straight traveling state when the fore-and-aft directional acceleration is less than the threshold. The controller selectively sets either one of the assisting operation and the generating operation based on whether the traveling state is estimated as the straight traveling state or the non-straight traveling state. According to this configuration, the selective setting of either the assisting operation or the generating operation can be performed immediately after the estimation of whether the machine body 2 is traveling straight or not.

The controller (that is, the working controller 70, the power controller 67) estimates, based on the width directional acceleration of the machine body 2 and on the yaw rate of the machine body 2, whether the machine body 2 is in the turning state where the machine body 2 is turning or not. The controller selectively sets either one of the assisting operation and the generating operation based on whether or not the traveling state is estimated as the turning state. According to this configuration, the selective setting of either the assisting operation or the generating operation can be performed immediately after the estimation of whether the machine body 2 is turning or not.

Either the powering torque setting unit 70b or the regenerating torque setting unit 70c changes the setting of either the powering torque or the regenerating torque based on the acceleration of the machine body 2. According to this configuration, the powering torque and the regenerating torques can be appropriately changed in correspondence to increase, reduction, or the like of the acceleration.

The controller (that is, the working controller 70, the power controller 67) changes either the first revolving speed N1 or the second revolving speed N2 based on the acceleration of the machine body 2. According to this configuration, based on the acceleration of the working machine 1 in operation, whether to intensify the assisting operation or the generating operation is easily determined.

The working controller 70 may stop or limit the assisting operation when an outputting condition relating to outputting from the traveling devices 4L and 4R deviates from that corresponding to an inputting condition relating to inputting to the traveling devices 4L and 4R. For example, the assisting operation is stopped or limited when it is hard for an operator operating the traveling operation member 54 to expect a profit of the assisting operation, such as when the traveling devices 4L and 4R run idle, the rotations of the traveling devices 4L and 4R stop, or the speed (vehicle speed) of the machine body 2 is too slow or too fast.

The following explains an operation when the outputting condition of the traveling devices 4L and 4R deviates from that corresponding to the inputting condition of the traveling devices 4L and 4R. In the following description, the explanation is made with the working controller 70 as an example, but the power controller 67 instead of the working controller 70 may perform the same operation of the working controller 70.

As shown in FIG. 8, the working machine 1 includes a rotation detector 85 configured to detect the rotation speeds of the traveling devices 4L and 4R. The rotation detector 85 includes sensors configured to detect respectively the rotation speeds M1 and M2 of the output shafts 35L and 35R of the traveling motors 36L and 36R.

When the operation extent of the traveling operation member 54 is defined as the inputting state and the rotation speeds M1 and M2 detected by the rotation detector 85 are defined as the outputting state, the working controller 70 stops or limits the assisting operation when the rotation speeds M1 and M2 are lower than that corresponding to the operation extent of the traveling operation member 54.

Figure 15:
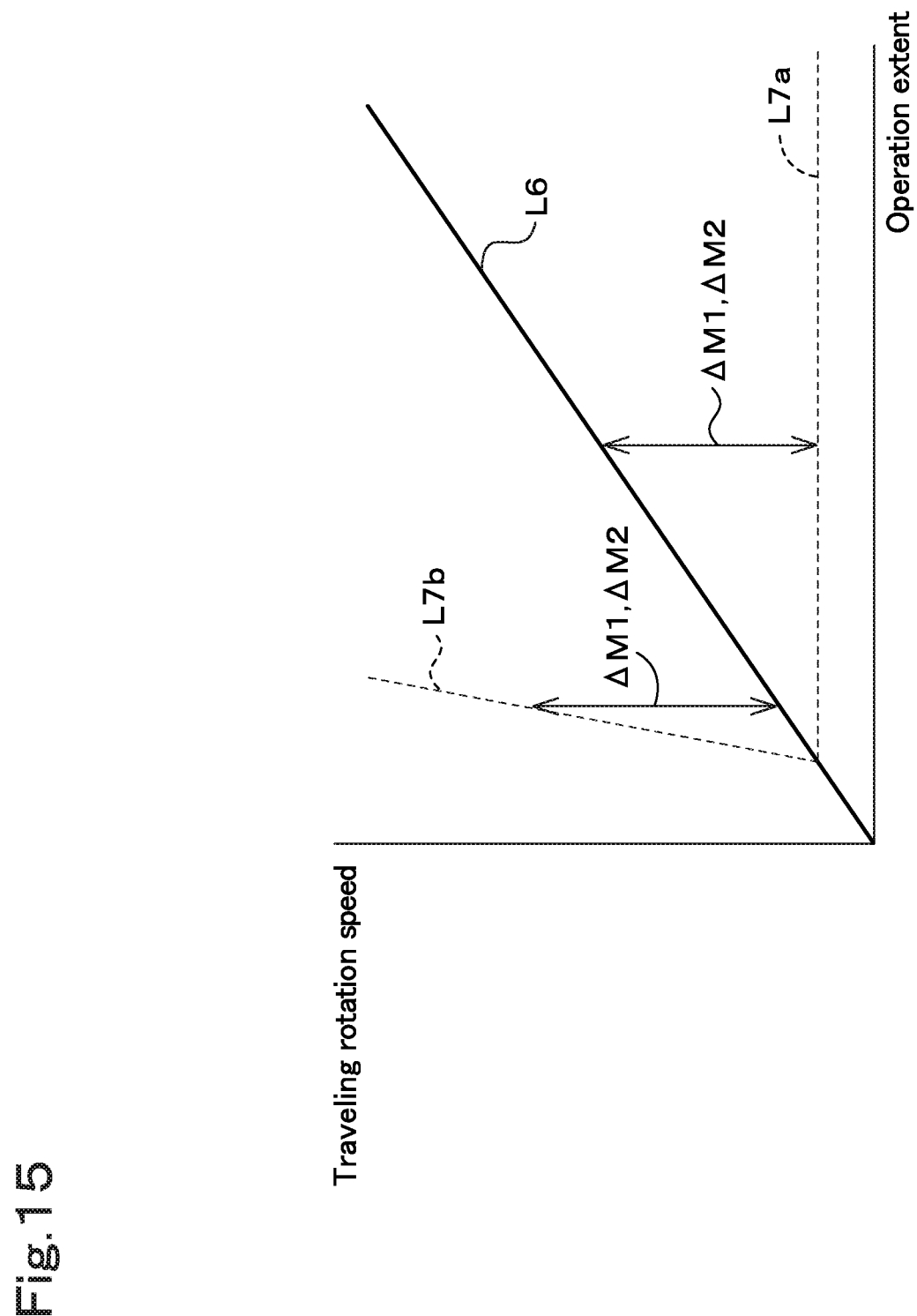
FIG. 15 is a view illustrating a relationship between an operation extent of a traveling operation member and a rotating speed of a traveling device.

For example, as shown in FIG. 15, during operation of the traveling operation member 54 for forward traveling, when the rotation speeds (referred to as traveling rotation speeds)

M1 and M2 detected by the rotation detector 85 gradually increase as shown in a line L6, the working controller 70 continues the assisting operation. On the other hand, the working controller 70 stops the assisting operation when the traveling rotation speeds M1 and M2 are almost zero as shown in a line L7a or when the rotations of the traveling devices 4L and 4R are stopped.

Figure 16A:
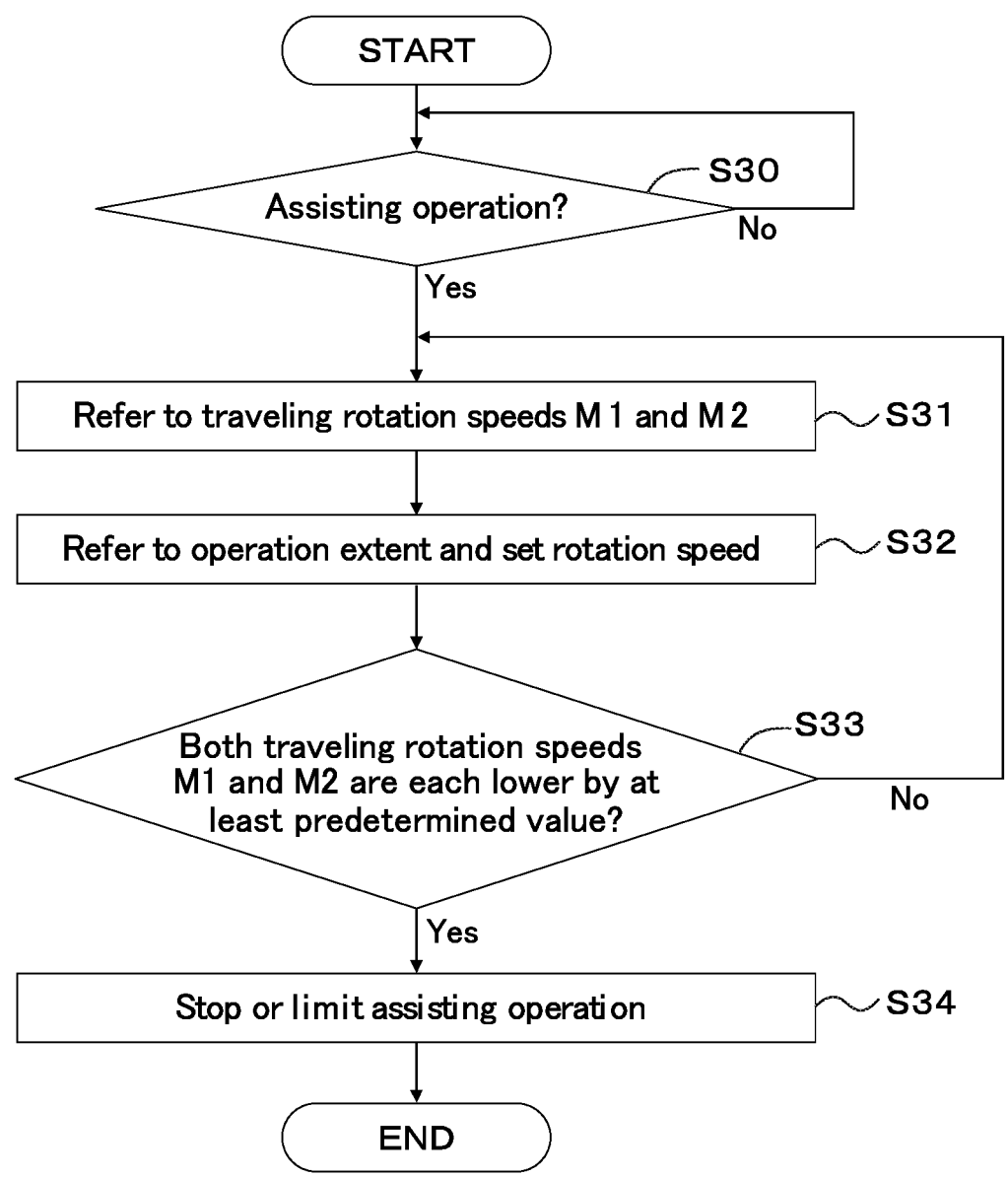
FIG. 16A is a view illustrating control under a state where traveling rotating speeds M1 and M2 is lower than that corresponding to an operation extent of the traveling operation member.

FIG. 16A shows a processing (that is, the control) to be executed when the traveling rotation speeds M1 and M2 are lower than that corresponding to the operation extent of the traveling operation member 54. As shown in FIG. 16A, when the assisting operation is being performed (S30, Yes), the working controller 70 refers to the traveling rotation speeds M1 and M2 detected by the rotation detector 85 (S31). In addition, the working controller 70 refers to either the operation extent of the traveling operation member 54 or the set rotation speed set based on the operation extent (S32). The working controller 70 judges whether both the traveling rotation speeds M1 and M2 are lower than that corresponding to the operation extent of the traveling operation member 54 by at least a predetermined value (S33). For example, as shown in FIG. 15, when rotation differences ΔM1 and ΔM2, which are differences between the set rotation speeds corresponding to the predetermined operation extent (the rotation speed set based on the line L6) and the actual traveling rotation speeds M1 and M2 detected by the rotation detector 85, are the predetermined value or more, and both the rotations of the traveling devices 4L and 4R are lower than the set rotation speeds by the predetermined value or more (S33, Yes), for example, when the traveling devices 4L and 4R stop or the traveling devices 4L and 4R run idle under low rotation speeds of the traveling rotation speeds M1 and M2, the assisting operation is stopped or limited (S34). When the assisting operation is limited, the torque set by the powering torque setting unit 70b based on the standard line L1 is reduced. For example, an amount of torque reduction may be set based on the magnitude of the rotation differences ΔM1 and ΔM2 (for example, the amount of torque reduction=the rotation differences ΔM1 and ΔM2×a constant).

In addition, the working controller 70 stops the assisting operation when both of the traveling rotation speeds M1 and M2 are higher than that corresponding to an operation extent of the traveling operation member 54.

As shown in FIG. 15, when both of the traveling rotation speeds M1 and M2 detected by the rotation detector 85 are higher than those on the line L7b, the working controller 70 stops or limits the assisting operation.

Figure 16B:
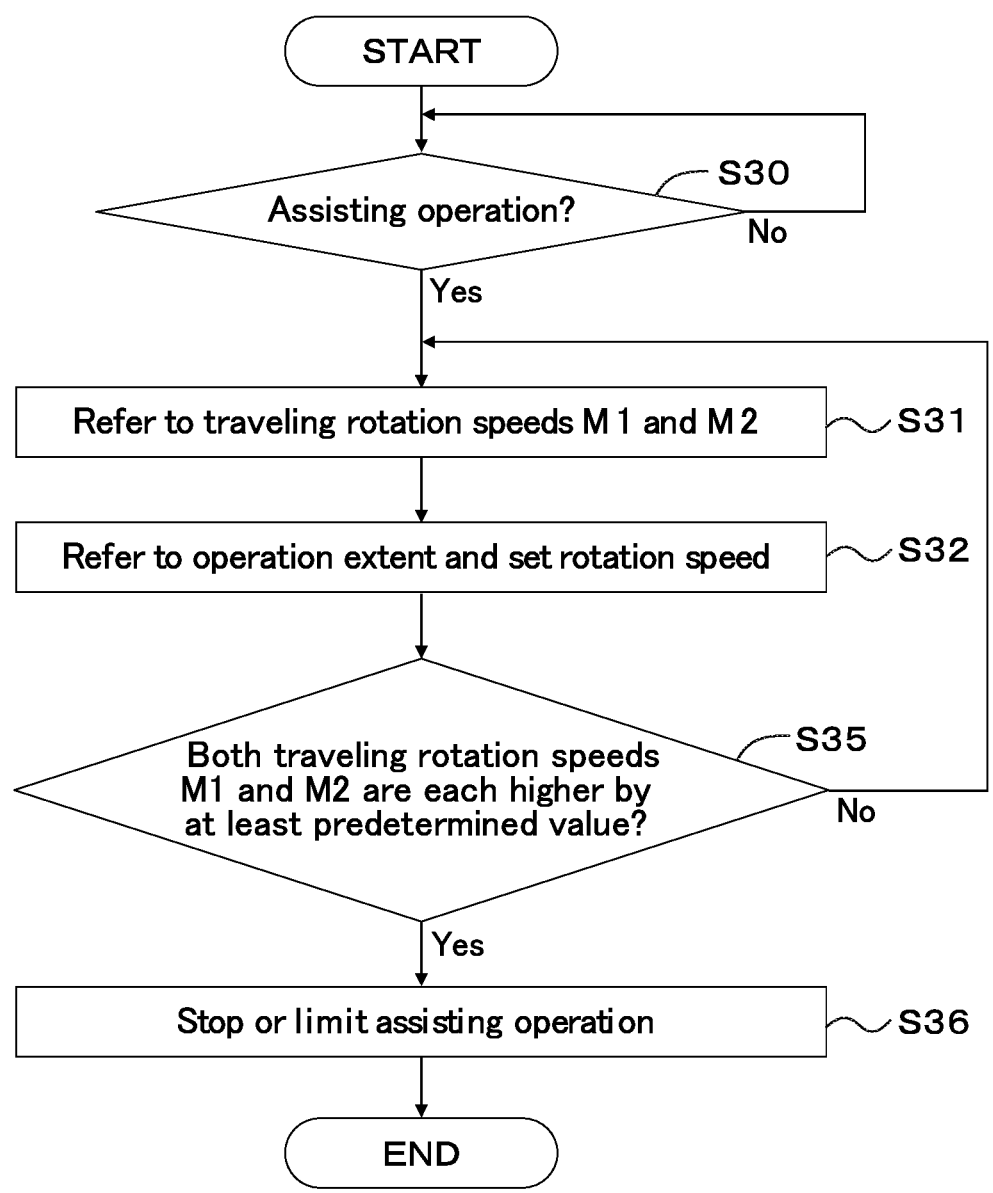
FIG. 16B is a view illustrating control under a state where traveling rotating speeds M1 and M2 is higher than that corresponding to an operation extent of the traveling operation member.

FIG. 16B shows a processing (that is, the control) to be executed in a case where the traveling rotation speeds M1 and M2 are higher than those corresponding to the operation extent of the traveling operation member 54. Steps S31 to S32 in FIG. 16B are the same as those in FIG. 16A. As shown in FIG. 16B, the working controller 70 judges whether each of the traveling rotation speeds M1 and M2 is higher than that corresponding to an operation extent of the traveling operation member 54 by at least a predetermined value (S35). For example, as shown in FIG. 15, when each of the rotation differences ΔM1 and M2 between the set rotation speeds corresponding to the predetermined operation extent and the traveling rotation speeds M1 and M2 detected by the rotation detector 85 is not lower than the predetermined value, and the traveling rotation speeds M1 and M2 are higher than those corresponding to the operation extent by at least the predetermined value (S35, Yes), for example, when the traveling rotation speeds M1 and M2 are high and the traveling devices 4L and 4R are accelerating during descending a slope, the assisting operation is stopped or limited (S36). The method for limiting the assisting operation is the same as that described above.

In the above-described embodiment, the assisting operation is stopped or limited when each of the traveling rotation speeds M1 and M2 of the traveling devices 4L and 4R is lower or higher than that corresponding to an operation extent of the traveling operation member 54. Alternatively, the assisting operation may be stopped or limited based on a speed (that is, the vehicle speed) of the machine body.

As shown in FIG. 8, the working machine 1 includes a vehicle-speed detector 86 configured to detect the vehicle speed of the machine body 2. The vehicle-speed detector 86 is a device configured to respectively convert the traveling rotation speeds M1 and M2 of the output shafts 35L and 35R of the traveling motors 36L and 36R into the traveling vehicle speeds V1 and V2. Although the vehicle-speed detector 86 is configured to convert the traveling rotation speeds M1 and M2 into the traveling vehicle speeds V1 and V2, rotations of any portions driving the traveling devices 4L and 4R of the working machine 1, such as rotations of axles, may be converted into the traveling vehicle speeds V1 and V2. What is converted to the traveling vehicle speed is not limited thereto.

When the operation extent of the traveling operation member 54 is defined as the inputting state and the traveling vehicle speeds V1 and V2 detected by the vehicle-speed detector 86 are defined as the outputting state, the working controller 70 stops or limits the assisting operation when the traveling vehicle speeds V1 and V2 are lower than that corresponding to the operation extent of the traveling operation member 54.

Figure 17:
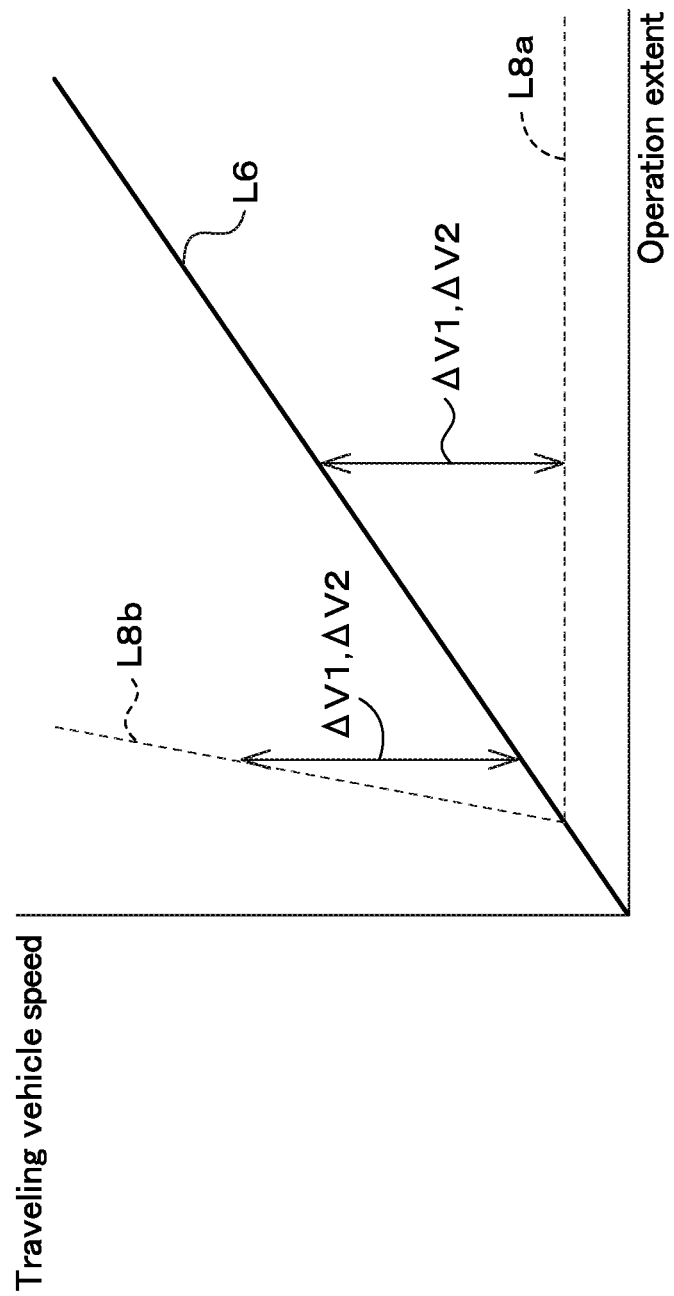
FIG. 17 is a view illustrating a relationship between an operation extent of the traveling operation member and a traveling vehicle speed.

For example, as shown in FIG. 17, when the traveling vehicle speeds V1 and V2 are gradually increased by operating the traveling operation member 54 is operated in the forward traveling operation direction, the working controller 70 continues the assisting operation. On the other hand, when the traveling vehicle speeds V1 and V2 scarcely rise (increase) as shown by a line L8a, the working controller 70 stops the assisting operation.

Figure 18A:
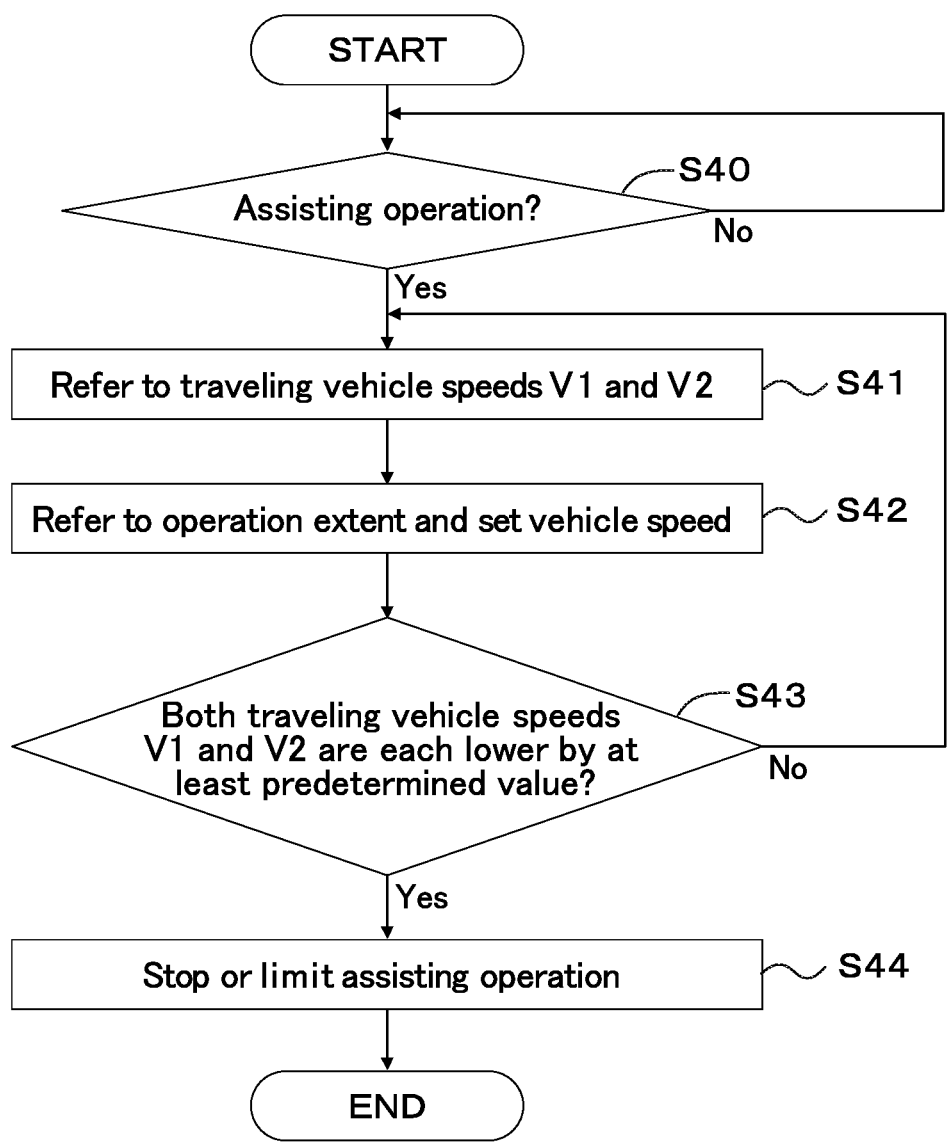
FIG. 18A is a view illustrating control under a state where traveling vehicle speeds V1 and V2 is lower than that corresponding to an operation extent of the traveling operation member.

As shown in FIG. 18A, when the assisting operation is being performed (S40, Yes), the working controller 70 refers to the traveling vehicle speeds V1 and V2 detected by the vehicle-speed detector 86 (S41). In addition, the working controller 70 refers to either an operation extent of the traveling operation member 54 or the vehicle speed set based on the operation extent (S42). The working controller 70 judges whether both of the traveling vehicle speed V1 and V2 are each lower than that corresponding to the operation extent of the traveling operation member 54 by at least a predetermined value (S43). For example, as shown in FIG. 17, when vehicle speed differences ΔV1 and ΔV2 between the set vehicle speed set based on the operation extent according to the line L6 and the actual traveling vehicle speeds V1 and V2 detected by the vehicle-speed detector 86 is a predetermined value or more and both of the traveling vehicle speeds V1 and V2 are each lower than that corresponding to the operation extent by at least the predetermined value (S43, Yes), for example, when the traveling devices 4L and 4R are stopped or the traveling devices 4L and 4R run idle under the low traveling vehicle speeds V1 and V2, the assisting operation is stopped or limited (S44). When the assisting operation is limited, the torque set by the powering torque setting unit 70b based on the standard line L1 is reduced.

For example, an amount of torque reduction may be set based on a magnitude of the vehicle speed differences ΔV1 and ΔV2 (for example, the amount of torque reduction=the vehicle speed differences ΔV1 and ΔV2×a constant).

In addition, the working controller 70 stops the assisting operation when both of the traveling vehicle speeds V1 and V2 are each higher than that corresponding to an operation extent of the traveling operation member 54.

As shown in FIG. 17, when the traveling vehicle speeds V1 and V2 given by operating the traveling operation member 54 in the forward-traveling operation direction are high as shown by the line L8b, the working controller 70 stops or limits the assisting operation.

Figure 18B:
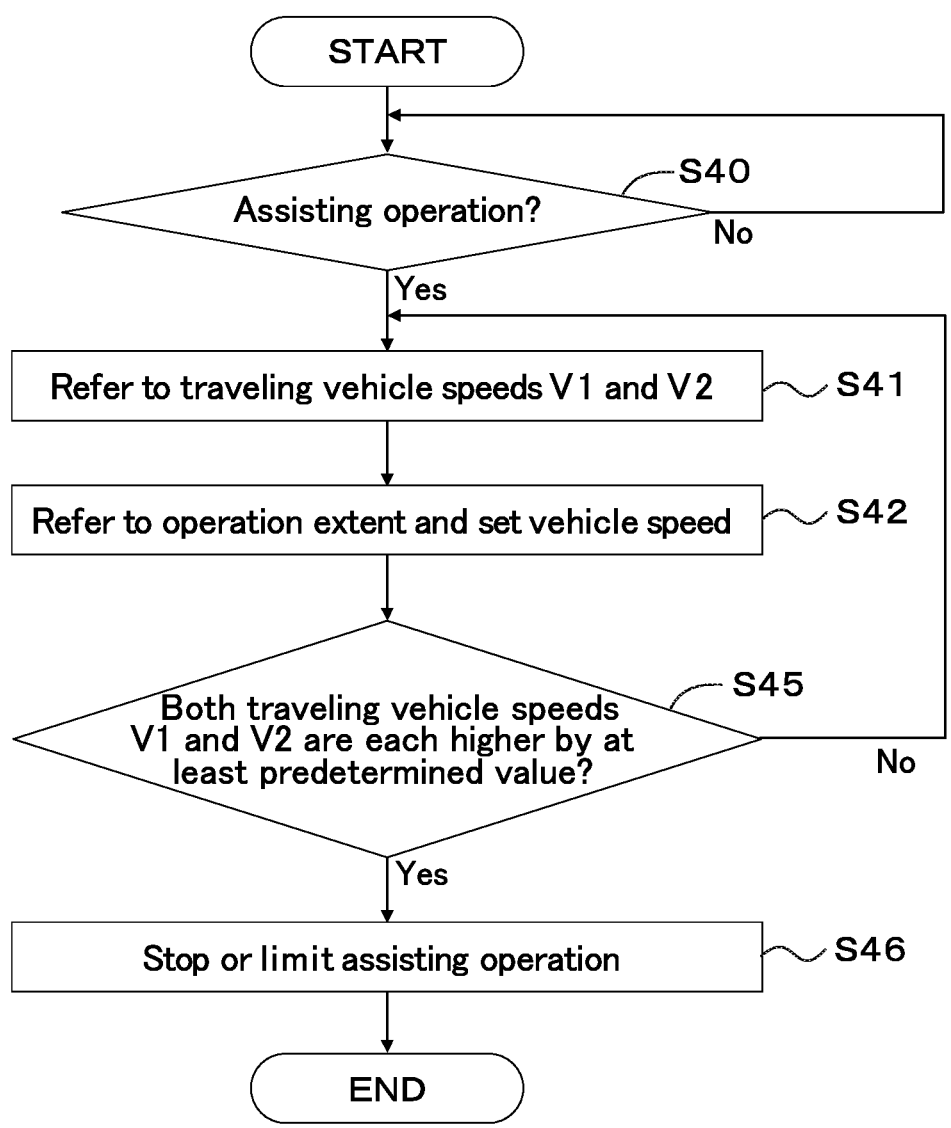
FIG. 18B is a view illustrating control under a state where traveling vehicle speeds V1 and V2 is higher than that corresponding to an operation extent of the traveling operation member.

FIG. 18B shows an operation performed when the traveling vehicle speeds V1 and V2 are each higher than that corresponding to an operation extent of the traveling operation member 54. Steps S41 to S42 in FIG. 18B are the same as those in FIG. 18A. As shown in FIG. 18B, the working controller 70 judges whether the traveling vehicle speeds V1 and V2 are each higher than that corresponding to the operation extent of the traveling operation member 54 by at least a predetermined value (S45). For example, as shown in FIG. 17, when the rotation differences ΔM1 and ΔM2 between the set vehicle speeds corresponding to a predetermined operation extent and the actual traveling vehicle speeds V1 and V2 detected by the vehicle-speed detector 86 are each equal to or larger than the predetermined value and the traveling vehicle speeds V1 and V2 are each higher than that corresponding to the operation extent by at least the predetermined value (S45, Yes), for example, when the traveling vehicle speeds V1 and V2 are high and the traveling devices 4L and 4R are accelerating during descending a slope, the assisting operation is stopped or limited (S46). The method for limiting the assisting operation is the same as the method described above.

The powering torque setting unit 70b increases the powering torque when a load on the engine 60 is increasing, and reduces the powering torque when the load on the engine 60 is reducing. In other words, the powering torque setting unit 70b increases the powering torque when the engine revolving speed detected by the detection sensor 91 is reducing, and reduces the powering torque when the engine revolving speed is increasing.

In particular, as shown in FIG. 21, when the engine revolving speed E1 detected by the detection sensor 91 gradually reduces after a time point P50 under the state where the working controller 70 (that is, the operation control unit 70d) is performing the assisting operation, the powering torque setting unit 70b gradually increases the powering torque from the time point P50 as the engine revolving speed E1 reduces. When the engine revolving speed E1 begins to gradually increase after a time point P51, the powering torque setting unit 70b gradually reduces the powering torque from the time point P51 in accordance with the gradual reduction in the engine revolving speed E1. In other words, under the state where the assisting operation is being performed, the powering torque setting unit 70b increases the powering torque in a reducing section T50 where the engine revolving speed E1 is reducing, and the powering torque setting unit 70b reduces the powering torque in an increasing section T51 where the engine revolving speed E1 is increasing.

When the motor generator 63 is performing the assisting operation and the outputting condition relating to outputting from the traveling devices 4L and 4R deviates from that corresponding to the inputting condition relating to inputting to the traveling devices 4L and 4R, the controller (that is, the working controller 70 or the power controller 67) stops or limits the assisting operation. According to this configuration, since the assisting operation by the motor generator 63 is not effective when the outputting condition of the traveling devices 4L and 4R deviates from that corresponding to the inputting condition of the traveling devices 4L and 4R, the unnecessary assisting operation is not performed, so that the assisting operation is performed only when the assistance is needed, thereby efficiently operating the motor generator.

The controller (that is, the working controller 70 or the power controller 67) stops or limits the assisting operation when the rotation speeds of the traveling rotation speeds M1 and M2 are each lower than that corresponding to the operation extent of the traveling operation member 54. According to this configuration, the assisting operation can be prevented from being wastefully performed. For example, an unnecessary assisting operation can be prevented when the machine body 2 or the like cannot travel forward or the traveling devices 4L and 4R slip wheels because the machine body 2 runs into earth or sand to fill its working tool with the earth or sand (in the scooping operation) to be conveyed.

The controller (that is, the working controller 70 or the power controller 67) stops or limits the assisting operation when the rotation speeds of the traveling rotation speeds M1 and M2 are each higher than that corresponding to the operation extent of the traveling operation member 54. According to this configuration, an unnecessary assist operation can be prevented when the vehicle is traveling downhill at the traveling rotation speeds M1 and M2 each of which is higher than that corresponding to the operation extent of the traveling operation member 54.

The controller (that is, the working controller 70 or the power controller 67) stops or limits the assisting operation when the traveling vehicle speeds V1 and V2 are each lower than that corresponding to an operation extent of the traveling operation member 54. According to this configuration, an unnecessary assisting operation can be prevented in a case where the traveling devices 4L and 4R slip wheels, for example, in the scooping operation.

The controller (that is, the working controller 70, the power controller 67) stops or limits the assisting operation when the traveling vehicle speeds V1 and V2 are higher than that corresponding to an operation extent of the traveling operation member 54. According to this configuration, the unnecessary assisting operation can be prevented in a case where the vehicle is traveling downhill.

The powering torque setting unit 70b reduces the powering torque when the outputting condition relating to outputting from the traveling devices 4L and 4R deviates from that corresponding to the inputting condition relating to inputting to the traveling devices 4L and 4R. Accordingly, consumption of electric power in the battery 66 can be suppressed in the assisting operation.

The working controller 70 may limit an output of the hydraulic driving device 64 and the assisting operation by, for example, setting an opening aperture of the anti-stall control valve 48 when the reduction amount (that is, a dropping amount) ΔE1 of the engine revolving speed is a predetermined value or more. For example, the working controller 70 limits outputs of the traveling pumps 52L and 52R to limit the powering torque in the assisting operation.

The following description explains an operation in a case where the reduction amount ΔE1 of the engine revolving speed is a predetermined value or more. In the following explanation, the working controller 70 is used as an example, but the power controller 67 instead of the working controller 70 may perform the same operation of the working controller 70.

Figure 19:
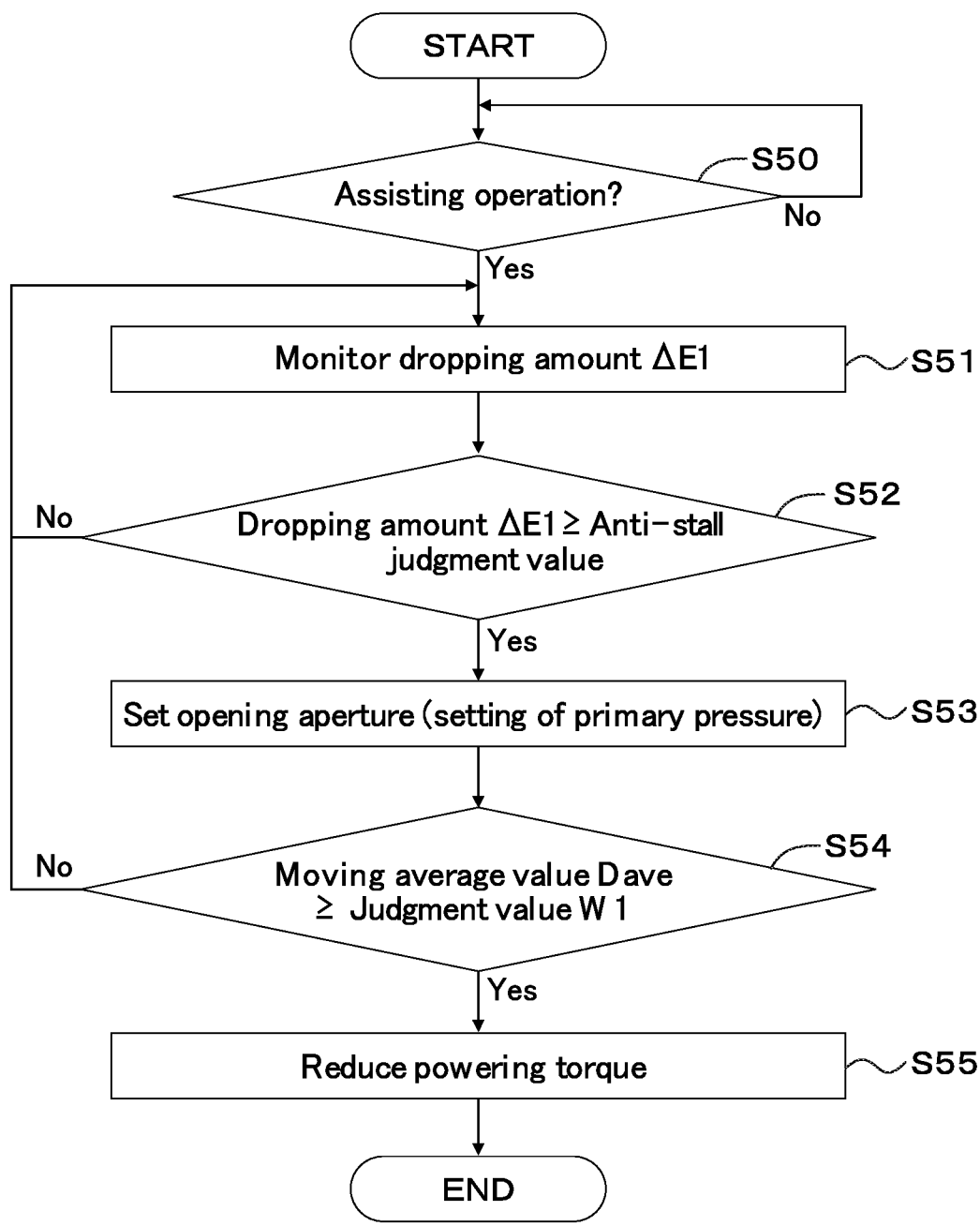
FIG. 19 is a view illustrating control under a state where a load is applied to an engine.
Figure 20:
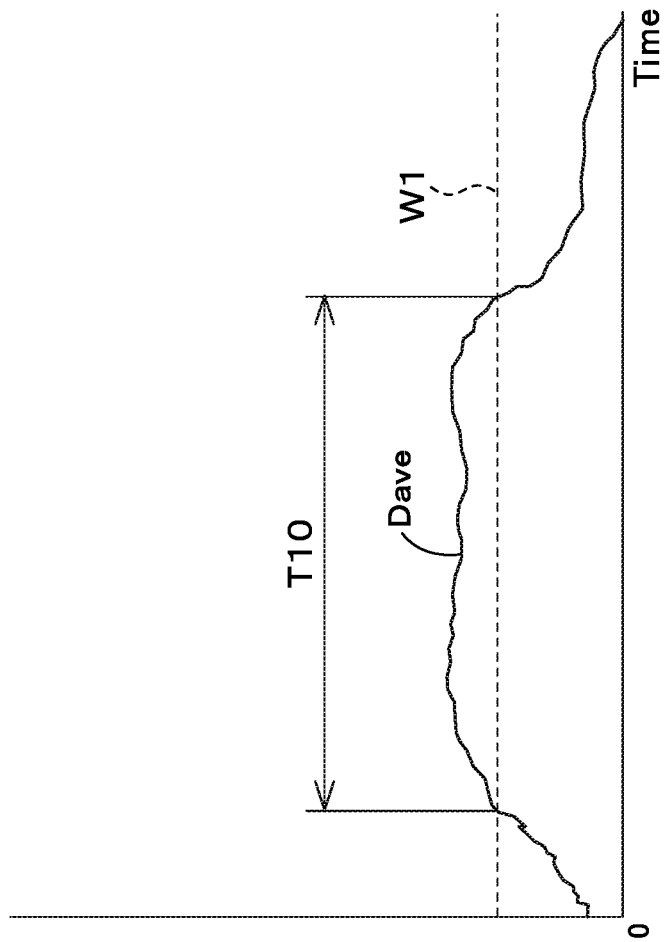
FIG. 20 is a view illustrating a relationship between a moving average value Dave of a reducing amount ΔE1 and a judgement value W1.

As shown in FIG. 19, when the assisting operation is being performed (S50, Yes), the working controller 70 monitors the reduction amount ΔE1 of the engine revolving speed (S51). When the reduction amount ΔE1 is the anti-stall judgment value or more (S52, Yes), an opening aperture of the anti-stall control valve 48 is set based on the setting line L52 (S53). In addition, the working controller 70 judges whether or not a moving average value Dave of the reduction amount ΔE1 is a judgment value W1 or more (S54). As shown in FIG. 20, when the moving average value Dave of the reduction amount ΔE1 is the predetermined judgment value W1 or more (S54, Yes), the working controller 70 reduces the torque to a new torque smaller than the powering torque set, based on the standard line L1, by the powering torque setting unit 70b (S55).

When the moving average value Dave of the reduction amount ΔE1 is the judgment value W1 or more for a predetermined period of time T10 or more, the powering torque setting unit 70b may reduce the torque from the powering torque set, based on the standard line L1, by the powering torque setting unit 70b.

For example, it is assumed that the powering torque provided when the moving average value Dave of the reduction amount ΔE1 is less than the judgment value W1 is set to a torque "J1." On the assumption, the powering torque setting unit 70b of the working controller 70 may reduce the powering torque J1 to a new powering torque J2 less than the powering torque J1 (J2<J1) when the moving average value Dave of the reduction amount ΔE1 is the judgment value W1 or more. In other words, the powering torque setting unit 70b reduces the powering torque to a new torque smaller than the powering torque corresponding to the standard line L1 during a period T1 where the moving average value Dave of the reduction amount ΔE1 is the judgment value W1 or more. For example, as shown in FIG. 9, the powering torque setting unit 70b sets the powering torque as the powering torque J2 based on a line L15 rather than the powering torque J1 based on the constant line L1b.

The slope of the line L15, that is, the reduction amount of the powering torque may be set to a predetermined value, or the reduction amount may be set based on the dropping amount ΔE, that is, the moving average value Dave.

In addition, when the moving average value Dave is the judgment value W1 or more, the working controller 70 may make the primary traveling pressure smaller than the pressure on a setting line L52 at a predetermined engine revolving speed. That is, the difference (referred to as a reducing pressure) between the pressure set based on the setting line L52 and the reference pilot pressure set based on the setting line L51 may be increased. That is, as shown in FIG. 7, when the moving average value Dave is the judgment value W1 or more, the working controller 70 increases a difference between the setting line L52 and the setting line L51 by changing the setting line L52 to a setting line L52a having a slope different from that of the setting line L52 or by moving the setting line L52 to a setting line L52b parallel to the setting line L52.

In the above-mentioned embodiment, the powering torque is reduced based on the moving average value Dave of the reduction amount ΔE1; however alternatively, the transition (an attenuating rate) of the reduction amount ΔE1 of the engine revolving speed may be obtained through a low-pass filter, and thus the powering torque may be reduced when the attenuating rate is the judgment value W1 or more. Also in this case, the method for reducing the powering torque is the same as the method described above.

In the above-mentioned embodiment, the opening aperture of the anti-stall control valve 48 is adjusted when the reduction amount ΔE1 of the engine revolving speed becomes a predetermined value more; however, in the working machine 1 that is not provided with the anti-stall control valve 48, the traveling motors 36L and 36R may be decelerated from the second speed to the first speed when the reduction amount ΔE1 is the anti-stall judgment value or more (S52, Yes).

The controller (that is, the working controller 70 or the power controller 67) limits the output of the hydraulic driving device 64 and limits the assisting operation when the reduction amount ΔE1 of the engine revolving speed is a predetermined value or more. Accordingly, not only the output of the hydraulic driving device 64 is limited based on the state of the engine 60, but also the assisting operation is limited. For example, in an overload state where the reduction amount ΔE1 of the engine revolving speed is a predetermined value or more, the overload on the engine 60 can be reduced by limiting the output of the hydraulic driving device 64, while the reduction in the storing capacity of the battery 66 can be suppressed by limiting the assisting operation.

The controller (that is, the working controller 70 or the power controller 67) limits the outputs of the traveling pumps 52L and 52R and limits the powering torque in the assisting operation.

According to this configuration, the reduction of the storing capacity of the battery 66 can be suppressed by limiting the powering torque under a state where the outputs of the traveling pumps 52L and 52R is reduced.

The controller (that is, the working controller 70 or the power controller 67) limits the primary traveling pressure output from the traveling operation valve 55 when the reduction amount ΔE1 of the engine revolving speed is a predetermined value or more. The controller (that is, the working controller 70 or the electric power controller 67) makes the primary traveling pressure (referred to as the primary pilot pressure) of the anti-stall control valve 48 smaller than the predetermined reference pilot pressure when the reduction amount ΔE1 of the engine revolving speed is the predetermined value or more. According to this configuration, the stalling of the engine 60 can be efficiently prevented by limiting the primary traveling pressure output from the traveling operation valve 55.

The controller (that is, the working controller 70 or the power controller 67) sets the reducing pressure, which is the difference between the primary traveling pressure and the reference pilot pressure, based on the reduction amount ΔE1 of the engine revolving speed. According to this configuration, the load on the engine 60 can be reduced.

The powering torque setting unit 70b reduces the powering torque based on the reduction amount ΔE1 of the engine revolving speed. According to this configuration, the powering torque can be adjusted according to the load on the engine 60.

In the above-described embodiment, the operation valves 55 and 59 are configured to change the pilot pressure when the working operation member 37 and the traveling operation member 57 are operated; however, the operation members may be electrically operable members. That is, the operating devices 43 and 53 may be devices configured to operate the hydraulic driving device 64, and the control valves 51 and 48 with electric signals.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a machine body;
an engine provided on the machine body;
a sensor to detect a revolving speed of the engine;
a motor generator to be operated as a motor to assist driving of the engine in an assisting operation and to be operated as a generator by power of the engine to generate electricity in a generating operation;
a battery to store the electricity generated by the motor generator;
an acceleration sensor to measure acceleration of the machine body; and
a controller, including a processor and an inverter, configured or programmed to cause the inverter to operate the motor generator as the motor to perform the assisting operation and cause the inverter to operate the motor generator as the generator to perform the generating operation, wherein
the controller estimates what kind of traveling state the machine body is in based on the acceleration of the machine body measured by the acceleration sensor, and
the controller is configured by electrical or electronic circuits or programmed to include a powering torque setting unit, a regenerating torque setting unit, and an operation control unit and to function so that:
the powering torque setting unit determines a value of a powering torque of the motor generator in the assisting operation based on the traveling state and the revolving speed of the engine;
the regenerating torque setting unit determines a value of a regenerating torque of the motor generator in the generating operation based on the traveling state and the revolving speed of the engine; and
the operation control unit causes the inverter to
operate the motor generator to perform the assisting operation at the value of the powering torque determined by the powering torque setting unit when the revolving speed of the engine is not higher than a first revolving speed, and
operate the motor generator to perform the generating operation at the value of the regenerating torque determined by the regenerating torque setting unit when the revolving speed of the engine is not lower than a second revolving speed that is higher than the first revolving speed.

2. The working machine according to claim 1, wherein
when a fore-and-aft directional acceleration of the machine body is not less than a threshold, the controller estimates that the machine body is in a straight traveling state where the machine body is traveling straight,
when the fore-and-aft directional acceleration of the machine body is less than the threshold, the controller estimates that the machine body is in a non-straight traveling state defined as any traveling state other than the straight traveling state, and
the controller selectively executes either one of the determination of the value of the powering torque by the powering torque setting unit and the determination of the value of the regenerating torque by the regenerating torque setting unit based on control information corresponding to the estimated straight traveling state or control information corresponding to the estimated non-straight traveling state and on the revolving speed of the engine.

3. The working machine according to claim 1, wherein
the controller estimates, based on a width directional acceleration of the machine body and on a yaw rate of the machine body, whether the machine body is in a turning state where the machine body is turning or is in a state other than the turning state, and
the controller selectively executes either one of the determination of the value of the powering torque by the powering torque setting unit and the determination of the value of the regenerating torque by the regenerating torque setting unit based on control information corresponding to the estimated turning state or control information corresponding to the estimated state other than the turning state and on the revolving speed of the engine.

4. The working machine according to claim 1, wherein
the controller changes at least either one of the first revolving speed and the second revolving speed based on the acceleration of the machine body.

5. The working machine according to claim 4, wherein
the controller changes the first revolving speed and the second revolving speed more in a direction lowering the revolving speed, as the larger the acceleration of the machine body becomes.

6. The working machine according to claim 1, wherein
the powering torque setting unit sets the value of the powering torque such that the larger the revolving speed of the engine becomes, the smaller the value of the powering torque becomes; and
the regenerating torque setting unit determines the value of the regenerating torque such that the larger the revolving speed of the engine becomes, the larger the value of the regenerating torque becomes.

* * * * *